United States Patent [19]
Pechanek et al.

[11] Patent Number: 5,659,785
[45] Date of Patent: Aug. 19, 1997

[54] ARRAY PROCESSOR COMMUNICATION ARCHITECTURE WITH BROADCAST PROCESSOR INSTRUCTIONS

[75] Inventors: Gerald G. Pechanek, Cary; Larry D. Larsen, Raleigh; Clair John Glossner, Durham, all of N.C.; Stamatis Vassiliaadis, Zoetermeer, Netherlands

[73] Assignee: International Business Machines Corporation, Armonk, N.Y.

[21] Appl. No.: 386,384

[22] Filed: Feb. 10, 1995

[51] Int. Cl.⁶ ........................................ G06F 15/80
[52] U.S. Cl. ............... 395/800.11; 395/379; 395/800.14
[58] Field of Search ........................... 395/800, 375, 395/27, 379, 384

[56] References Cited

U.S. PATENT DOCUMENTS

| | | | |
|---|---|---|---|
| 4,371,931 | 2/1983 | Catiller et al. | 364/200 |
| 4,616,313 | 10/1986 | Aoyagi | 364/200 |
| 4,807,113 | 2/1989 | Matsumoto et al. | 364/200 |
| 5,163,120 | 11/1992 | Childers et al. | 395/800 |
| 5,201,056 | 4/1993 | Daniel et al. | 395/800 |
| 5,218,706 | 6/1993 | Komori et al. | 395/775 |
| 5,218,709 | 6/1993 | Fijany et al. | 395/800 |
| 5,269,007 | 12/1993 | Hanawa et al. | 395/375 |
| 5,269,008 | 12/1993 | Kobayashi et al. | 395/375 |
| 5,542,026 | 7/1996 | Pechanek et al. | 395/27 |

FOREIGN PATENT DOCUMENTS

| | | |
|---|---|---|
| 0280969 | 9/1988 | European Pat. Off. . |
| 0422964 | 4/1991 | European Pat. Off. . |
| 0602909 | 6/1994 | European Pat. Off. . |
| 2262175 | 6/1993 | United Kingdom . |

OTHER PUBLICATIONS

Martin Gold, "Signal Path: TI's Competitive Edge", *Electrical Engineering Times*, Mar. 28, 1994, p. 68.
Gerald G. Pechanek, "Mfast: Mwave Folded Array Signal Transform Processor Architecture & Design Specification", IBM DSP Hardware Development, Research Triangle Park, North Carolina, Aug. 19, 1994.

*Primary Examiner*—Larry D. Donaghue
*Attorney, Agent, or Firm*—Steven B. Phillips; John E. Hoel

[57] ABSTRACT

A plurality of processor elements (PEs) are connected in a cluster by a common instruction bus to a sequencing control unit with its associated instruction memory. Each PE has data buses connected to at least its four nearest PE neighbors, referred to as its North, South, East and West PE neighbors. Each PE also has a general purpose register file containing several operand registers. A common instruction is fetched from the instruction memory by the sequencing control unit and broadcast over the instruction bus to each PE in the cluster. The instruction includes an upcode value that controls the arithmetic or logical operation performed by an execution unit in the PE on one or more operands in the register file. A switch is included in each PE to interconnect it with a first PE neighbor as the destination to which the result from the execution unit is sent. The broadcast instruction includes a destination field that controls the switch in the PE, to dynamically select the destination neighbor PE to which the result is sent. Further, the broadcast instruction includes a target field that controls the switch in the PE, to dynamically select the operand register in the register file of the PE, to which another result received from another neighbor PE in the cluster is stored. In this manner, the instruction broadcast to all the PEs in the cluster, dynamically controls the communication of operands and results between the PEs in the cluster, in a single instruction, multiple data processor array.

5 Claims, 26 Drawing Sheets

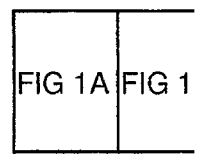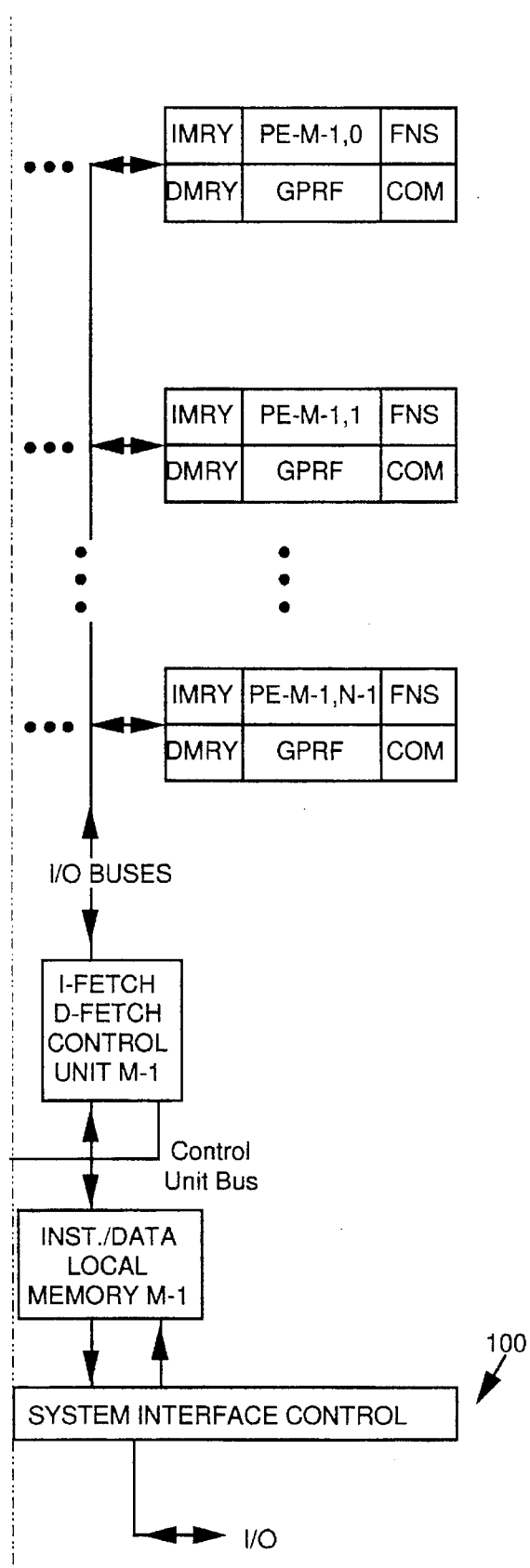
High Level Mwave Array Machine Organization Multiple ControlUnits
FIG 1B First Example Mfast Instruction Format for Communications Second Example Mfast Instruction Format for Communications Single-PE (diagonal) Node Flow with Connection Interfaces

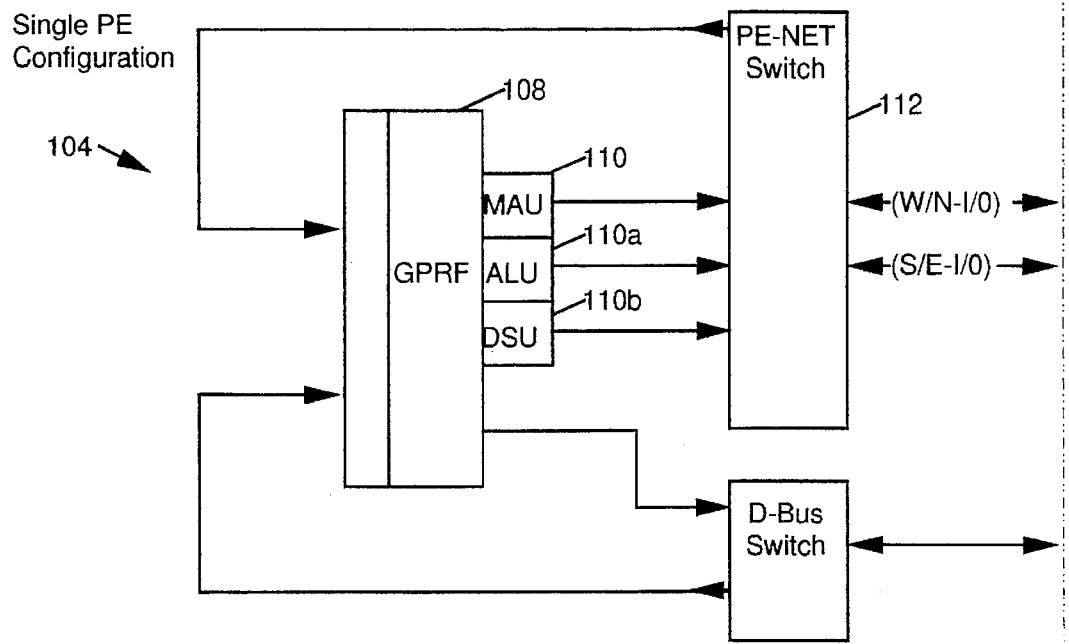
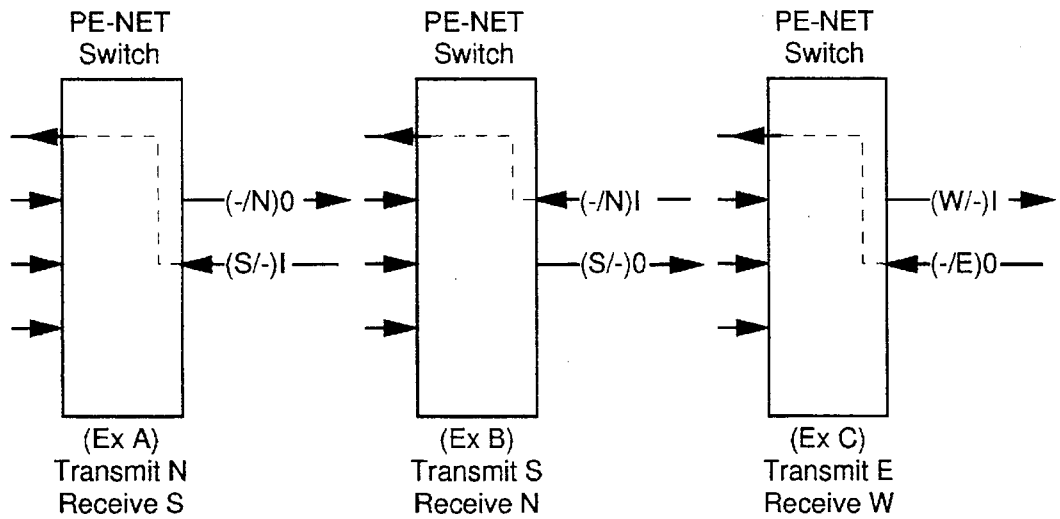
(I, O represents the Input, Output, or bi-directional ports.)
Nearest-Neighbor Communication Examples in a Single-PE Node
FIG 6A

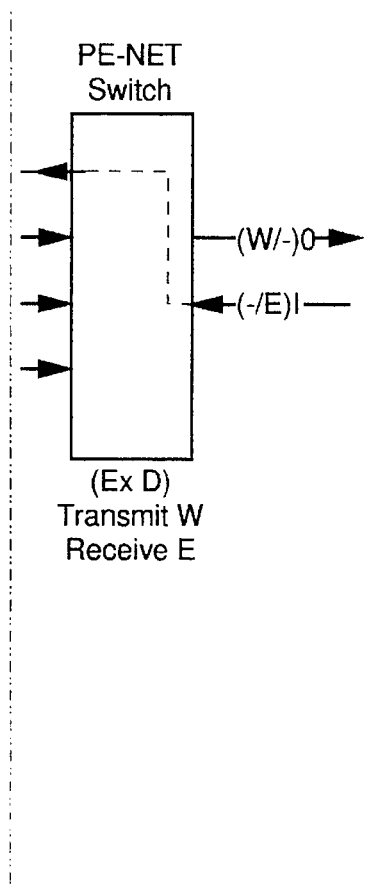
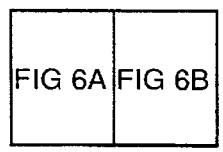
FIG 6B (I, O represents the Input, Output or bi-directional ports.)

Nearest-Neighbor Communication Examples in a Dual-PE Node

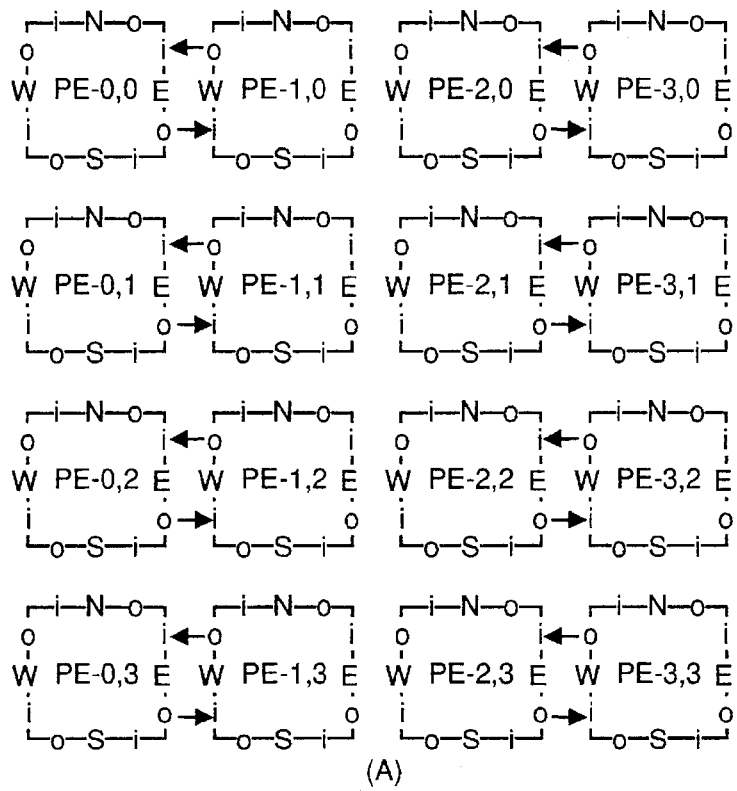
(A)
Col-Ring 0 ↔ Col-Ring 1 & Col-Ring 2 ↔ Col-Ring 3
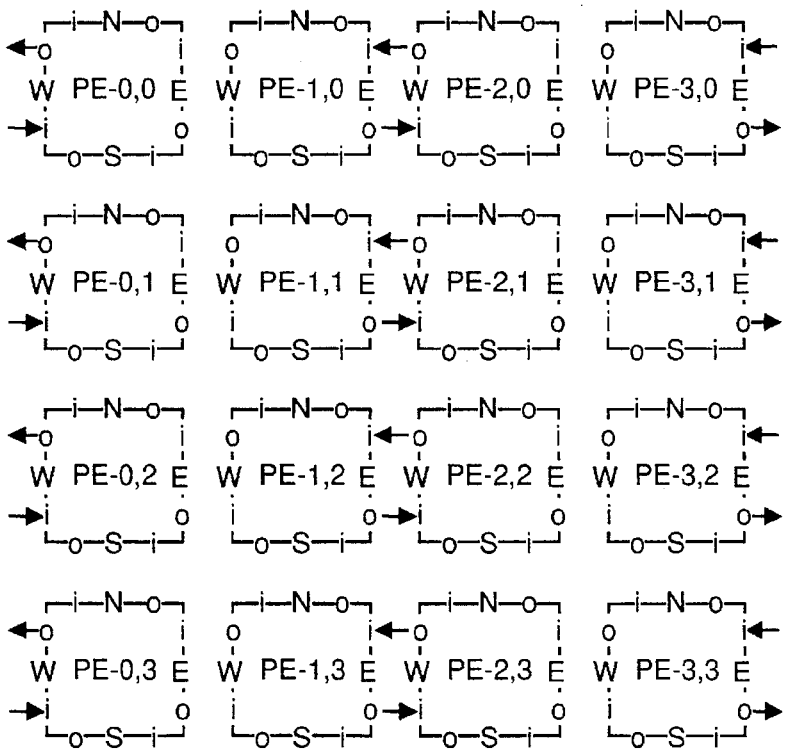
(C)
Col-Ring 0 ↔ Col-Ring 3 & Col-Ring 1 ↔ Col-Ring 2
FIG 8A

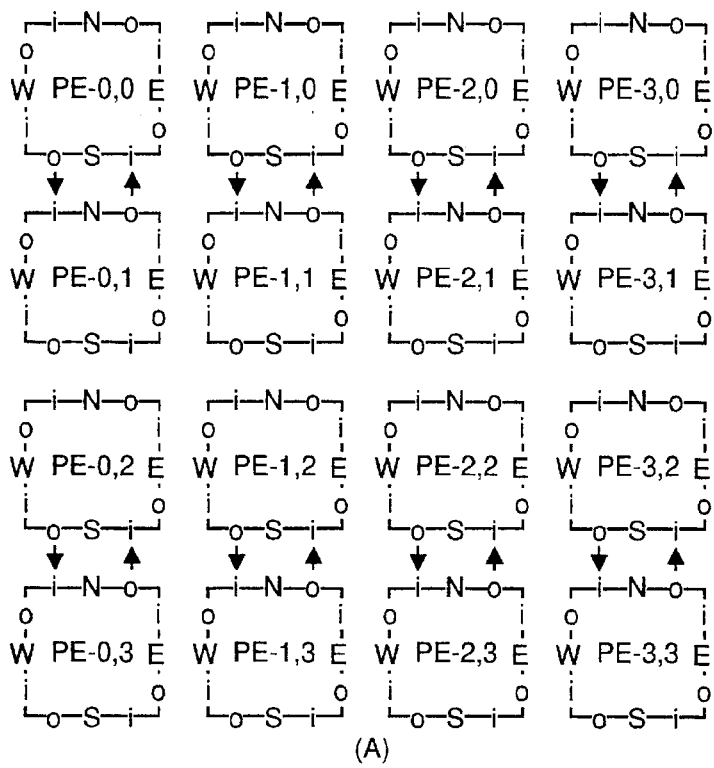
(A)
Row-Ring 0 ↔ Row-Ring 1 & Row-Ring 2 ↔ Row-Ring 3
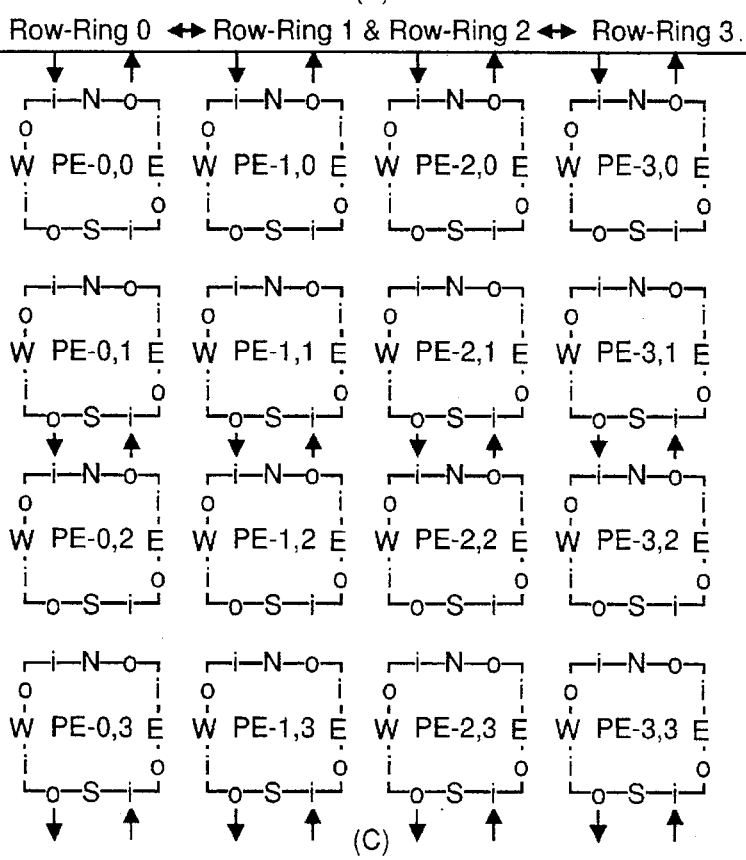
(C)
Row-Ring 0 ↔ Row-Ring 3 & Row-Ring 1 ↔ Row-Ring 2
FIG 9A

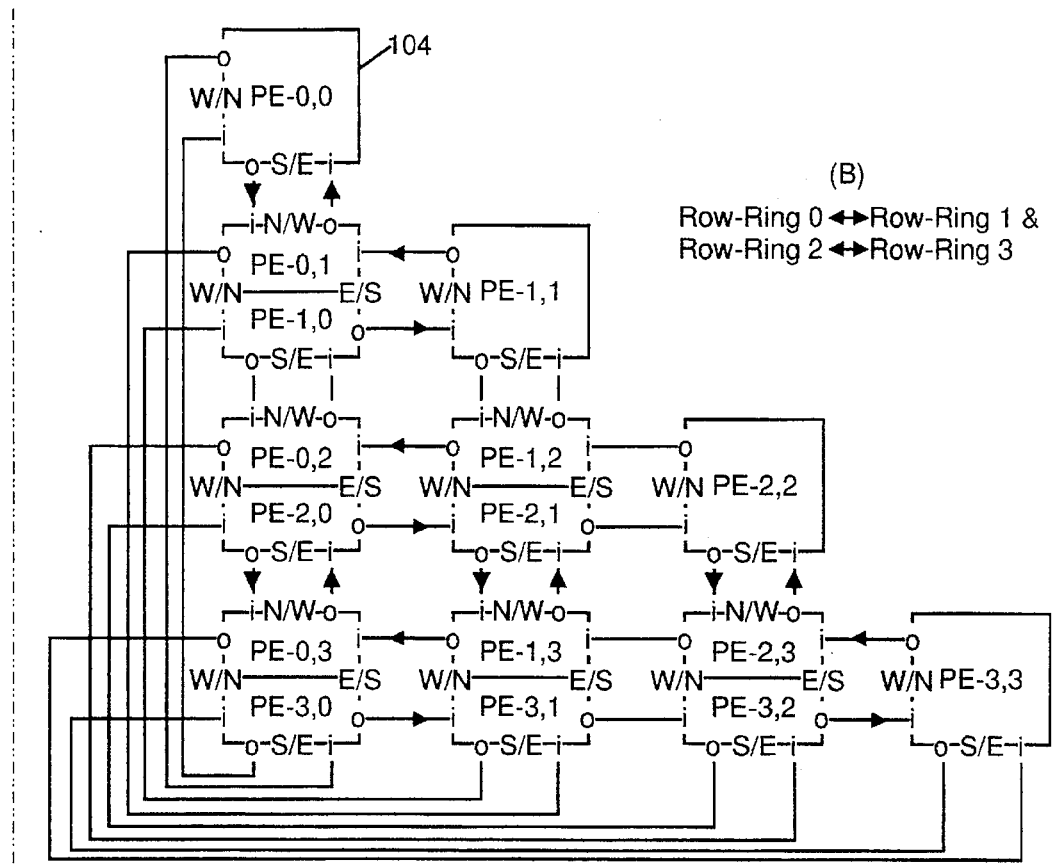
(B)
Row-Ring 0 ⟷ Row-Ring 1 &
Row-Ring 2 ⟷ Row-Ring 3
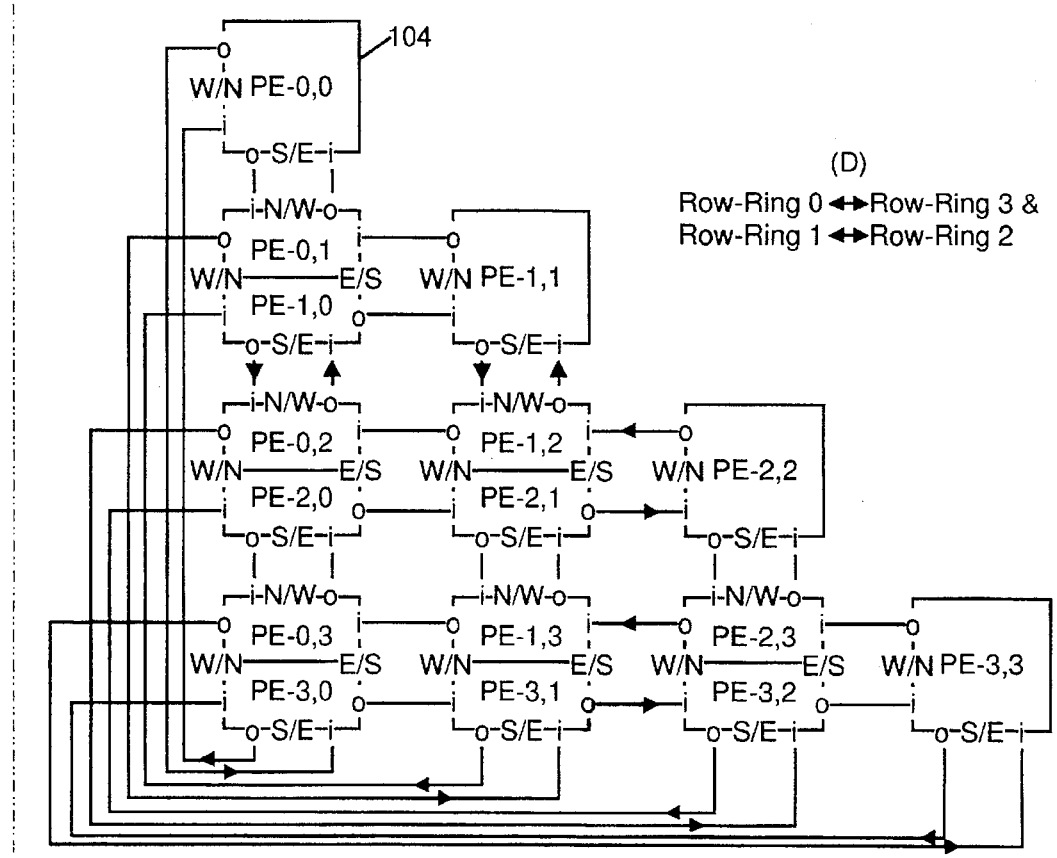
(D)
Row-Ring 0 ⟷ Row-Ring 3 &
Row-Ring 1 ⟷ Row-Ring 2
FIG 9B Flow Organization of a Processing Element. This diagram depicts the flow of an individual Processing Element (PE), showing all its arithmetic facilities and the points defined for connection to switch logic and a paired PE.

General Form of the Data Select Unit (DSU)

Example of DSU Use. In this example, byte B of the source is placed in the low-order 8 bits of the destination register and all the remaining destination bits are forced to be same as the sign bit of the byte. These functions are performed by the Data Selector logic.

Folded Array Fast Odd/Even Symmetric 1-D DCT

| R1 | A0 | H0 |
|----|----|-----|
| R2 | A7 | H7 |
| R4 |    |    |
| RF | c4x | c7x |

| R1 | B0 | G0 |
|----|----|-----|
| R2 | B7 | G7 |
| R4 |    |    |
| RF | c6x | -cx |

| R1 | B1 | G1 |
|----|----|-----|
| R2 | B6 | G6 |
| R4 |    |    |
| RF | c6x | -cx |

| R1 | A1 | H1 |
|----|----|-----|
| R2 | A6 | H6 |
| R4 |    |    |
| RF | c4x | c7x |

(local) $R1(h0) \leftarrow 0..0, R0(b0) + 0..0, R0(b2)$
(local) $R1(h1) \leftarrow 0..0, R0(b0) - 0..0, R0(b2)$
(local) $R2(h0) \leftarrow 0..0, R0(b1) + 0..0, R0(b3)$
(local) $R2(h1) \leftarrow 0..0, R0(b1) - 0..0, R0(b3)$ $RF = R15@PE\text{-}0 \leftarrow MEM(C)$
$\phantom{RF=\ }R15@PE\text{-}1 \leftarrow MEM(C)$
$\phantom{RF=\ }R15@PE\text{-}2 \leftarrow MEM(C)$
$\phantom{RF=\ }R15@PE\text{-}3 \leftarrow MEM(C)$

| R1 | C0 | F0 |
|----|----|-----|
| R2 | C7 | F7 |
| R4 |    |    |
| RF | -c4x | -cx |

| R1 | C1 | F1 |
|----|----|-----|
| R2 | C6 | F6 |
| R4 |    |    |
| RF | -c4x | -cx |

| R1 | C2 | F2 |
|----|----|-----|
| R2 | C5 | F5 |
| R4 |    |    |
| RF | -c4x | -cx |

| R1 | A2 | H2 |
|----|----|-----|
| R2 | A5 | H5 |
| R4 |    |    |
| RF | c4x | c7x |

| R1 | B2 | G2 |
|----|----|-----|
| R2 | B5 | G5 |
| R4 |    |    |
| RF | c6x | -cx |

| R1 | D0 | E0 |
|----|----|-----|
| R2 | D7 | E7 |
| R4 |    |    |
| RF | -c6x | c7x |

| R1 | D1 | E1 |
|----|----|-----|
| R2 | D6 | E6 |
| R4 |    |    |
| RF | -c6x | c7x |

| R1 | D2 | E2 |
|----|----|-----|
| R2 | D5 | E5 |
| R4 |    |    |
| RF | -c6x | c7x |

| R1 | D3 | E3 |
|----|----|-----|
| R2 | D4 | E4 |
| R4 |    |    |
| RF | -c6x | c7x |

| R1 | A3 | H3 |
|----|----|-----|
| R2 | A4 | H4 |
| R4 |    |    |
| RF | c4x | c7x |

| R1 | B3 | G3 |
|----|----|-----|
| R2 | B4 | G4 |
| R4 |    |    |
| RF | c6x | -cx |

| R1 | C3 | F3 |
|----|----|-----|
| R2 | C4 | F4 |
| R4 |    |    |
| RF | -c4x | -cx |

Execution of Butterfly Surrogate

FIG 14

Columns 0-3

R3 ← R1(h0) x R15(h0) + R3=0
R4 ← R1(h1) x R15(h1) + R4=0

R1@S-DEST ← R1

RF= R15@PE-0 ← MEM(C+1)
    R15@PE-1 ← MEM(C+1)
    R15@PE-2 ← MEM(C+1)
    R15@PE-3 ← MEM(C+1)

| R1 | D0 | E0 |
|----|----|----|
| R3 | f00-1=A0(c4x) ||
| R4 | f07-1=H0(c7x) ||
| RF | c4x | -cx |

| R1 | A0 | H0 |
|----|----|----|
| R3 | f02-1=B0(c6x) ||
| R4 | f05-1=G0(-cx) ||
| RF | c2x | c5x |

| R1 | D1 | E1 |
|----|----|----|
| R3 | f10-1=A1(c4x) ||
| R4 | f17-1=H1(c7x) ||
| RF | c4x | -cx |

| R1 | A1 | H1 |
|----|----|----|
| R3 | f12-1=B1(c6x) ||
| R4 | f15-1=G1(-cx) ||
| RF | c2x | c5x |

| R1 | B0 | G0 |
|----|----|----|
| R3 | f04-1=C0(-c4x) ||
| R4 | f03-1=F0(-cx) ||
| RF | -c4x | -c7x |

| R1 | D2 | E2 |
|----|----|----|
| R3 | f20-1=A2(c4x) ||
| R4 | f27-1=H2(c7x) ||
| RF | c4x | -cx |

| R1 | B1 | G1 |
|----|----|----|
| R3 | f14-1=C1(-c4x) ||
| R4 | f13-1=F1(-cx) ||
| RF | -c4x | -c7x |

| R1 | A2 | H2 |
|----|----|----|
| R3 | f22-1=B2(c6x) ||
| R4 | f25-1=G2(-cx) ||
| RF | c2x | c5x |

| R1 | B2 | G2 |
|----|----|----|
| R3 | f24-1=C2(-c4x) ||
| R4 | f23-1=F2(-cx) ||
| RF | -c4x | -c7x |

| R1 | C0 | F0 |
|----|----|----|
| R3 | f06-1=D0(-c6x) ||
| R4 | f01-1=E0(c7x) ||
| RF | c2x | c5x |

| R1 | D3 | E3 |
|----|----|----|
| R3 | f30-1=A3(c4x) ||
| R4 | f37-1=H3(c7x) ||
| RF | c4x | -cx |

| R1 | C1 | F1 |
|----|----|----|
| R3 | f16-1=D1(-c6x) ||
| R4 | f11-1=E1(c7x) ||
| RF | c2x | c5x |

| R1 | A3 | H3 |
|----|----|----|
| R3 | f32-1=B3(c6x) ||
| R4 | f35-1=G3(-cx) ||
| RF | c2x | c5x |

| R1 | C2 | F2 |
|----|----|----|
| R3 | f26-1=D2(-c6x) ||
| R4 | f21-1=E2(c7x) ||
| RF | c2x | c5x |

| R1 | B3 | G3 |
|----|----|----|
| R3 | f34-1=C3(-c4x) ||
| R4 | f33-1=F3(-cx) ||
| RF | -c4x | -c7x |

| R1 | C3 | F3 |
|----|----|----|
| R3 | f36-1=D3(-c6x) ||
| R4 | f31-1=E3(c7x) ||
| RF | c2x | c5x |

1st Execution of Multiply Add and DSU Send Surrogate
FIG 15

```
Columns 0-3

R3 ← R1(h0) x R15(h0) + R3=fzx-1
R4 ← R1(h1) x R15(h1) + R4=fzx-1

R1@S-DEST ← R1

RF= R15@PE-0 ← MEM(C+2)
    R15@PE-1 ← MEM(C+2)
    R15@PE-2 ← MEM(C+2)
    R15@PE-3 ← MEM(C+2)
```

| R1 | C0 | F0 |
|---|---|---|
| R3 | D0(c4x)+f00-1 ||
| R4 | E0(-cx)+f07-1 ||
| RF | c4x | c3x |

| R1 | D0 | E0 |
|---|---|---|
| R3 | A0(c2x)+f02-1 ||
| R4 | H0(c5x)+f05-1 ||
| RF | -c2x | c3x |
| R1 | C1 | F1 |
| R3 | D1(c4x)+f10-1 ||
| R4 | E1(-cx)+f17-1 ||
| RF | c4x | c3x |

| R1 | D1 | E1 |
|---|---|---|
| R3 | A1(c2x)+f12-1 ||
| R4 | H1(c5x)+f15-1 ||
| RF | -c2x | c3x |

| R1 | A0 | H0 |
|---|---|---|
| R3 | F0(-c4x)+f04-1 ||
| R4 | G0(-c7x)+f03-1 ||
| RF | c4x | c3x |
| R1 | C2 | F2 |
| R3 | D2(c4x)+f20-1 ||
| R4 | E2(-cx)+f27-1 ||
| RF | c4x | c3x |

| R1 | A1 | H1 |
|---|---|---|
| R3 | B1(-c4x)+f14-1 ||
| R4 | G1(-c7x)+f13-1 ||
| RF | c4x | c3x |
| R1 | D2 | E2 |
| R3 | A2(c2x)+f22-1 ||
| R4 | H2(c5x)+f25-1 ||
| RF | -c2x | c3x |

| R1 | A2 | H2 |
|---|---|---|
| R3 | B2(-c4x)+f24-1 ||
| R4 | G2(-c7x)+f23-1 ||
| RF | c4x | c3x |

| R1 | B0 | G0 |
|---|---|---|
| R3 | C0(c2x)+f06-1 ||
| R4 | F0(c5x)+f01-1 ||
| RF | -c2x | c3x |
| R1 | C3 | F3 |
| R3 | D3(c4x)+f30-1 ||
| R4 | E3(-cx)+f37-1 ||
| RF | c4x | c3x |

| R1 | B1 | G1 |
|---|---|---|
| R3 | C1(c2x)+f16-1 ||
| R4 | F1(c5x)+f11-1 ||
| RF | -c2x | c3x |
| R1 | D3 | E3 |
| R3 | A3(c2x)+f32-1 ||
| R4 | H3(c5x)+f35-1 ||
| RF | -c2x | c3x |

| R1 | B2 | G2 |
|---|---|---|
| R3 | C2(c2x)+f26-1 ||
| R4 | F2(c5x)+f21-1 ||
| RF | -c2x | c3x |
| R1 | A3 | H3 |
| R3 | B3(-c4x)+f34-1 ||
| R4 | G3(-c7x)+f33-1 ||
| RF | c4x | c3x |

| R1 | B3 | G3 |
|---|---|---|
| R3 | C3(c2x)+f36-1 ||
| R4 | F3(c5x)+f31-1 ||
| RF | -c2x | c3x |

2nd Execution of Multiply Add and DSU Send Surrogate

Columns 0-3

R3 ← R1(h0) × R15(h0) + R3 = fzx-2
R4 ← R1(h1) × R15(h1) + R4 = fzx-2

R1@S-DEST ← R1

RF = R15@PE-0 ← MEM(C+3)
     R15@PE-1 ← MEM(C+3)
     R15@PE-2 ← MEM(C+3)
     R15@PE-3 ← MEM(C+3)

```
R1 ─D0────E0─   R1 ─D1────E1─
R3 │ A0(c4x)+f04-2  R3 │ A1(c4x)+f14-2
R4 │ H0(c3x)+f03-2  R4 │ H1(c3x)+f13-2
RF │ c4x  │ -c5x    RF │ c4x  │ -c5x
R1 │ B2   │ G2      R1 │ C2   │ F2          R1 ─D2────E2─
R3 │ C2(c4x)+f20-2  R3 │ D2(-c2x)+f22-2     R3 │ A2(c4x)+f24-2
R4 │ F2(c3x)+f27-2  R4 │ E2(c3x)+f25-2      R4 │ H2(c3x)+f23-2
RF │ c4x  │ -c5x    RF │ -c6x │ c7x         RF │ c4x  │ -c5x

R1 ─A0────H0─   R1 ─A1────H1─   R1 ─A2────H2─
R3 │ B0(-c2x)+f06-2  R3 │ B1(-c2x)+f16-2  R3 │ B2(-c2x)+f26-2
R4 │ G0(c3x)+f01-2   R4 │ G1(c3x)+f11-2   R4 │ G2(c3x)+f21-2
RF │ c6x  │ cx       RF │ c6x  │ cx       RF │ c6x  │ cx      R1 ─A3────H3─
R1 │ B3   │ G3       R1 │ C3   │ F3       R1 │ D3   │ E3      R3 │ B3(-c2x)+f36-2
R3 │ C3(c4x)+f30-2   R3 │ D3(-c2x)+f32-2  R3 │ A3(c4x)+f34-2  R4 │ G3(c3x)+f31-2
R4 │ F3(c3x)+f37-2   R4 │ E3(c3x)+f35-2   R4 │ H3(c3x)+f33-2  RF │ c6x  │ cx
RF │ c4x  │ -c5x     RF │ -c6x │ c7x      RF │ c4x  │ -c5x
```

3rd Execution of Multiply Add and DSU Send Surrogate

Columns 0-3

R3 ← R1(h0) × R15(h0) + R3 = fzx-3
R4 ← R1(h1) × R15(h1) + R4 = fzx-3

R1@S-DEST ← R1

RF = R15@PE-0 ← MEM(C)
     R15@PE-1 ← MEM(C)   With Modulo
     R15@PE-2 ← MEM(C)   Addressing
     R15@PE-3 ← MEM(C)

4th Execution of Multiply Add and DSU Send Surrogate

FIG 18

(paired-PE) R1(h0) ← R3(h1) + R5(h1)
(paired-PE) R1(h1) ← R3(h1) - R5(h1)
(paired-PE) R2(h0) ← R4(h1) + R6(h1)
(paired-PE) R2(h1) ← R4(h1) - R6(h1)

for Az, Bz, ... Hz z now equals row values

Execution of Butterfly with Clustered PE Destination Surrogate

ARRAY PROCESSOR COMMUNICATION ARCHITECTURE WITH BROADCAST PROCESSOR INSTRUCTIONS

FIELD OF THE INVENTION

The invention disclosed broadly relates to data processing systems and method and more particularly relates to improvements in array processor architectures.

BACKGROUND OF THE INVENTION

Related Patent Applications

The invention disclosed herein is related to the U.S. patent application Ser. No. 07/864,112, filed Apr. 6, 1992, entitled "Massively Parallel Array Processor", by G. G. Pechanek, et al., assigned to the IBM Corporation and incorporated herein by reference.

The invention disclosed herein is also related to the U.S. patent application by G. G. Pechanek, et al. which is entitled "DISTRIBUTED CONTROL PIPELINE WITH JOINT PE/SEQUENCER CONTROL", Ser. No. 08/365,858, filed Dec. 29, 1994, assigned to the International Business Machines Corporation, and incorporated herein by reference.

The invention disclosed herein is also related to the U.S. Pat. Application by G. G. Pechanek, et al. which is entitled "ARRAY PROCESSOR TOPOLOGY RECONFIGURATION SYSTEM AND METHOD", Ser. No. 08/366,140, filed Dec. 29, 1994, assigned to the International Business Machines Corporation, and incorporated herein by reference.

The invention disclosed herein is also related to the U.S. patent application by G. G. Pechanek, et al. which is entitled "PARALLEL PROCESSING SYSTEM AND METHOD USING SURROGATE INSTRUCTIONS", Ser. No. 08/373,128, filed Jan. 17, 1995, assigned to the International Business Machines Corporation, and incorporated herein by reference.

Communications in an instruction-driven programmable parallel processing system typically possesses an inherent latency in communicating between the processing elements. Communication instructions and communications between buffering memories are standard approaches for interfacing between processing elements. All these approaches possess an inherent latency which must be accounted for before data can be further processed. This degrades the potential performance that a parallel processing system can achieve.

OBJECTS OF THE INVENTION

It is therefore an object of the invention to provide an improved instruction driven programmable parallel processing system.

It is another object of the invention to provide an improved parallel processing system that reduces the inherent latency in communicating between processors.

It is still a further object of the invention to provide an improved parallel processing system which has improved performance characteristics.

SUMMARY OF THE INVENTION

These and other objects, features and advantages are accomplished by the invention. A plurality of processor elements (PEs) are connected in a cluster by a common instruction bus to a control unit or sequence processor (SP) which distributes instructions fetched from an instruction memory. Each PE has data buses connected to at least two PEs in a linear array and at least four nearest PE neighbors in a 4 PE neighborhood mesh, referred to as its North, South, East and West PE neighbors. Each PE also has a general purpose register file containing several operand registers. A common instruction fetched from the instruction memory is broadcast by the control unit over the instruction bus to each PE in the cluster. The instruction includes an opcode value that controls the arithmetic or logical or pass through operation performed by an execution unit in the PE on operands from one or more operand registers in the register file. A switch is included in each PE to interconnect it with a first PE neighbor as the destination to which the result from the execution unit is sent. In accordance with the invention, the broadcast instruction includes a destination field that controls the switch in the PE, to dynamically configure the communication paths between PEs, thereby selecting the destination PE to which the result is sent. Further in accordance with the invention, the broadcast instruction includes a target field that dynamically selects the operand register in the register file of the PE, to which another result received from another neighbor PE in the cluster through the switch-configured communication path is stored. In this manner, the instruction broadcast to all the PEs in the cluster, dynamically controls the communication of operands and results between the PEs in the cluster, in a single instruction, multiple data processor array.

DESCRIPTION OF THE FIGURES

These and other objects, features and advantages will be more fully appreciated with reference to the accompanying figures.

FIG. 1 is divided into FIGS. 1A and 1B for convenience.

FIG. 4 is divided into FIGS. 4A and 4B for convenience.

FIG. 5 is divided into FIGS. 5A, 5B, 5C and 5D for convenience.

FIG. 6 is a nearest-neighbor communication example in a single processor element node. FIG. 6 is divided into FIGS. 6A and 6B.

FIG. 7 is divided into FIGS. 7A and 7B for convenience.

FIG. 8 is divided into FIGS. 8A and 8B for convenience.

FIG. 9 is a logical and folded mesh representation of adjacent processor element row communications. FIG. 9 is divided into FIGS. 9A and 9B for convenience.

FIG. 14 illustrates the execution of a butterfly surrogate.

FIG. 15 illustrates the first execution of multiply add and DSU send surrogate.

FIG. 16 illustrates the second execution of multiply add and DSU send surrogate.

FIG. 17 illustrates the third execution of multiply add and DSU send surrogate.

FIG. 18 illustrate the fourth execution of multiply add and DSU send surrogate.

FIG. 19 illustrates the execution of the butterfly with a clustered processor element destination surrogate.

DISCUSSION OF THE PREFERRED EMBODIMENT

Figure 1A:
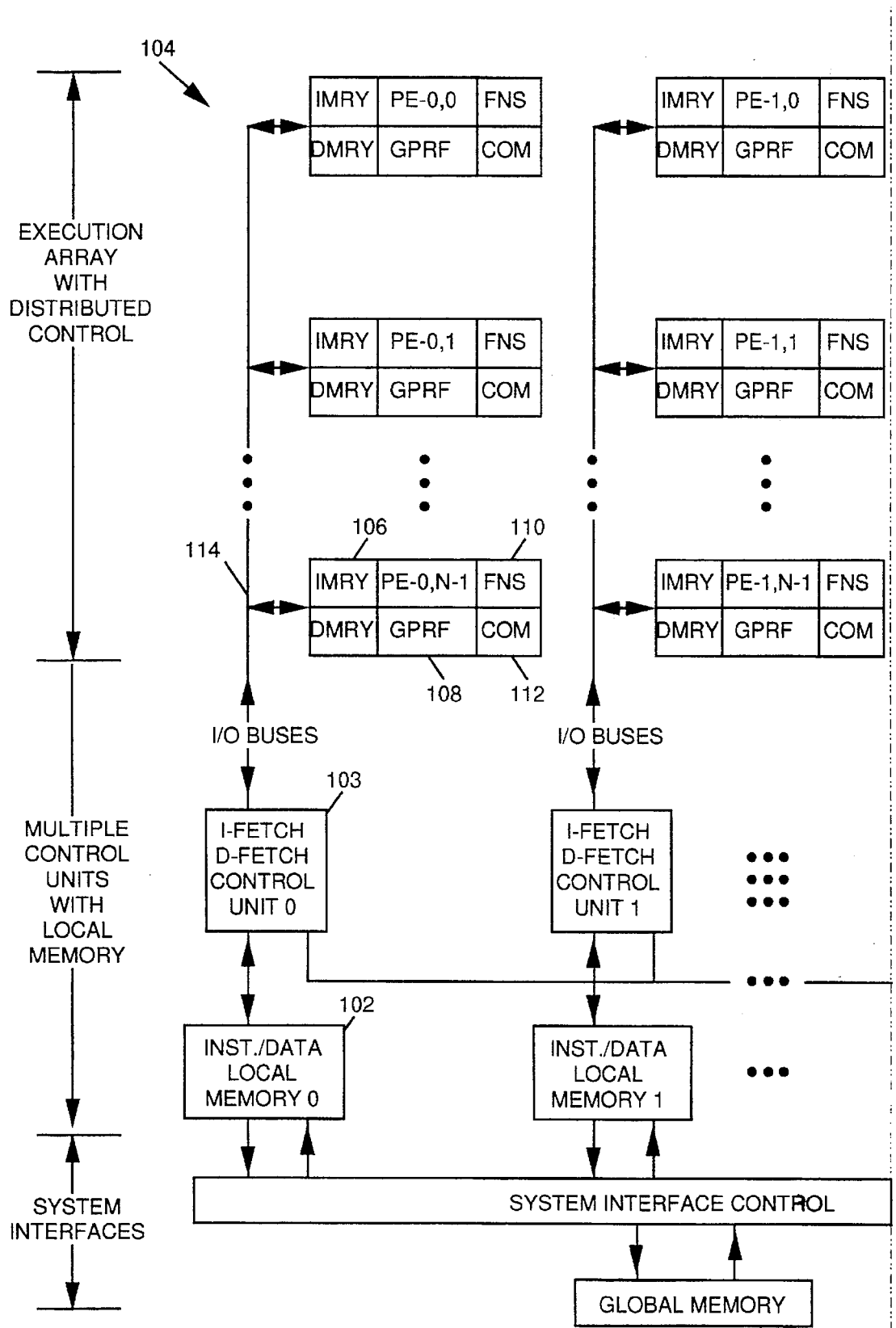
FIG. 1 is a high level array machine organization diagram for multiple control units.

FIG. 1 depicts a high level view of the array processor machine organization. The machine organization is partitioned into three main parts: the System Interfaces including Global Memory 100 and external I/O, multiple Control Units 103 with Local Memory 102, and the Execution Array with Distributed Control PEs 104. The System Interface is an application-dependent interface through which the array processor interfaces with Global Memory, the I/O, other system processors, and the personal computer/workstation host. Consequently, the System Interface will vary depending upon the application and the overall system design. The Control Units 103 contain the local memory 102 for instruction and data storage, instruction fetch (I-Fetch) mechanisms, and operand or data fetch mechanisms (D-Fetch). The Execution Array with Distributed Control PEs 104 is a computational topology of processing elements chosen for a particular application. For example, the array may consists of N Processing Elements (PEs) 104 per control unit 103, with each PE containing an Instruction Buffer (IMRY) 106, a General Purpose Register File (GPRF) 108, Functional Execution units (FNS) 110, Communication Facilities (COM) 112, and interfaces to its Instruction bus 114 and its data buses. The PEs may also contain PE-local instruction and data memories. Further, each PE contains an instruction decode register 116 shown in FIG. 4, which supports distributed control of the multiple PEs. Synchronism of local memory accessing is a cooperative process between the control units 103, local memories 102, and the PEs 104. The array of PEs allows computation functions (FNS) to be executed in parallel in the PEs and results to be communicated (COM) between PEs.

With the multiple single instruction, multiple data (MSIMD) machine organization, e.g. FIG. 1, it is possible to create single or multiple thread machines wherein the topology of PEs and communication facilities can be configured for a more optimum topology depending upon the application. For example, some possible machine organizations are; multiple linear rings, a nearest neighbor 2-dimension mesh array, a folded nearest neighbor 2-dimension mesh, multiple-fold mesh, a 2-dimension hexagonal array, a folded 2-dimension hexagonal array, a folded mesh of trees, combinations of the above as well as others.

Figure 2:
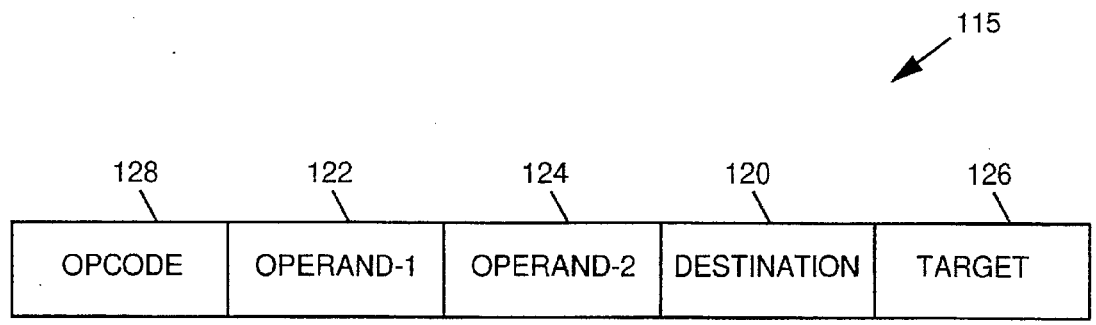
FIG. 2 is an example instruction format for communications, in accordance with the invention.
Figure 3:
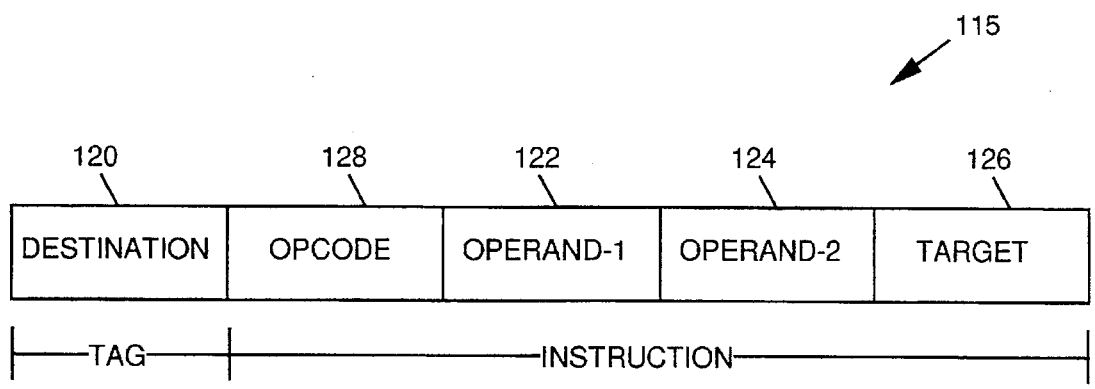
FIG. 3 is a second example instruction format for communications, in accordance with the invention.

The basic concept involved in the array processor family is that the communications of results between direct-attached processing elements can be specified in the processing element instruction set architecture 115 in FIGS. 2 and 3. In a typical RISC uni-processor, the destination of results from functional execution units is implied to be the processor's own register file. The array processor breaks this "tradition", changing the definition of result destination from, to an implied single processor local destination, a directly-connected multiple processor destination. With this architecture and directly-connected PE-to-PE links, we can claim that communications between the directly connected PEs can be done with zero communication latency. The architecture provides this capability by including a destination field 120 in the simplex instructions 115 indicating the directly-connected succeeding PE where the result target register resides, which is specified by the target field 126. FIG. 2 shows a basic simplex 32-bit instruction 115 used in the processor, though 16-bit, 64-bit, etc. formats can use the same principle. For a four PE neighborhood, a North, East, West, and South PE destination is coded in the destination field 120. The array processor is providing a 4-bit field here to allow for growth up to 16 destinations, e.g., up to eight clustered processors (used in a three fold array) and up to an eight neighborhood array. Examples of topologies with direct-attached PEs are a nearest neighbor mesh, a folded mesh, a tree array, hypercubes, etc. It should also be appreciated that due to the clustering and nearest neighbor mesh organizations, the Physical Design process will physically place the directly connected PEs in close proximity to each other supporting short cycle times. Further, it should be appreciated that this binding of the communications destination specification in the instruction set format is done purposely to, not only provide 0-communication latency, but also to ensure hazard free communications in a SIMD array of processing elements. For explanation purposes only, the array processor is used to describe the architectural details involved in implementing the described communications concept.

In the array processor instruction 115, the Operand-1 field 122, Operand-2 field 124, and Target field 126 are register specifications and the Destination field 120 specifies the direct attached succeeding processing element to which the result is to be communicated. The opcode field 128 specifies the arithmetic or logical or pass through operation to be performed by a selected execution unit.

In this type of SIMD array processors it is possible to tag the destination field as is shown in the second example instruction format of FIG. 3, and use mode control instructions in the sequencer controller units to set the tag. The tags are then distributed to the PEs in the array. In order to change communication directions, a mode control instruction is issued prior to the execution of the instruction that communicates the result value. There are a number of implications in this approach. First, by tagging, the instruction has full use of the instruction field for function definition. Second, Tagging incurs an additional latency whenever the destination needs to be changed during communicating. If the loading of the tag register can be incorporated as a separate executable instruction field in a surrogate very large instruction word (VLIW), then it becomes possible to change the destination on a cycle by cycle basis. This minimizes the effect of the tag-setting latency at the expense of complex control algorithms.

The single, diagonally folded array processor element (PE) data flow will be briefly described. The folded-array nodes are of two types: diagonal nodes containing a single Processing Element, and all other nodes which contain two PEs each. The details of each type are discussed in the following sections.

The core logic of each folded array node is the Processing Element (PE) 104. As noted earlier, the folded array has two node types: those containing a single Processing Element and those containing dual Processing Elements. The single-PE nodes are those on the diagonal of the folded mesh; there are four such nodes in a 4×4 single, diagonal fold array. The remaining six nodes contain 2 PEs each. Overall, then, there are 16 Processing Elements in the folded 4×4 array distributed among ten nodes.

Figure 4A:
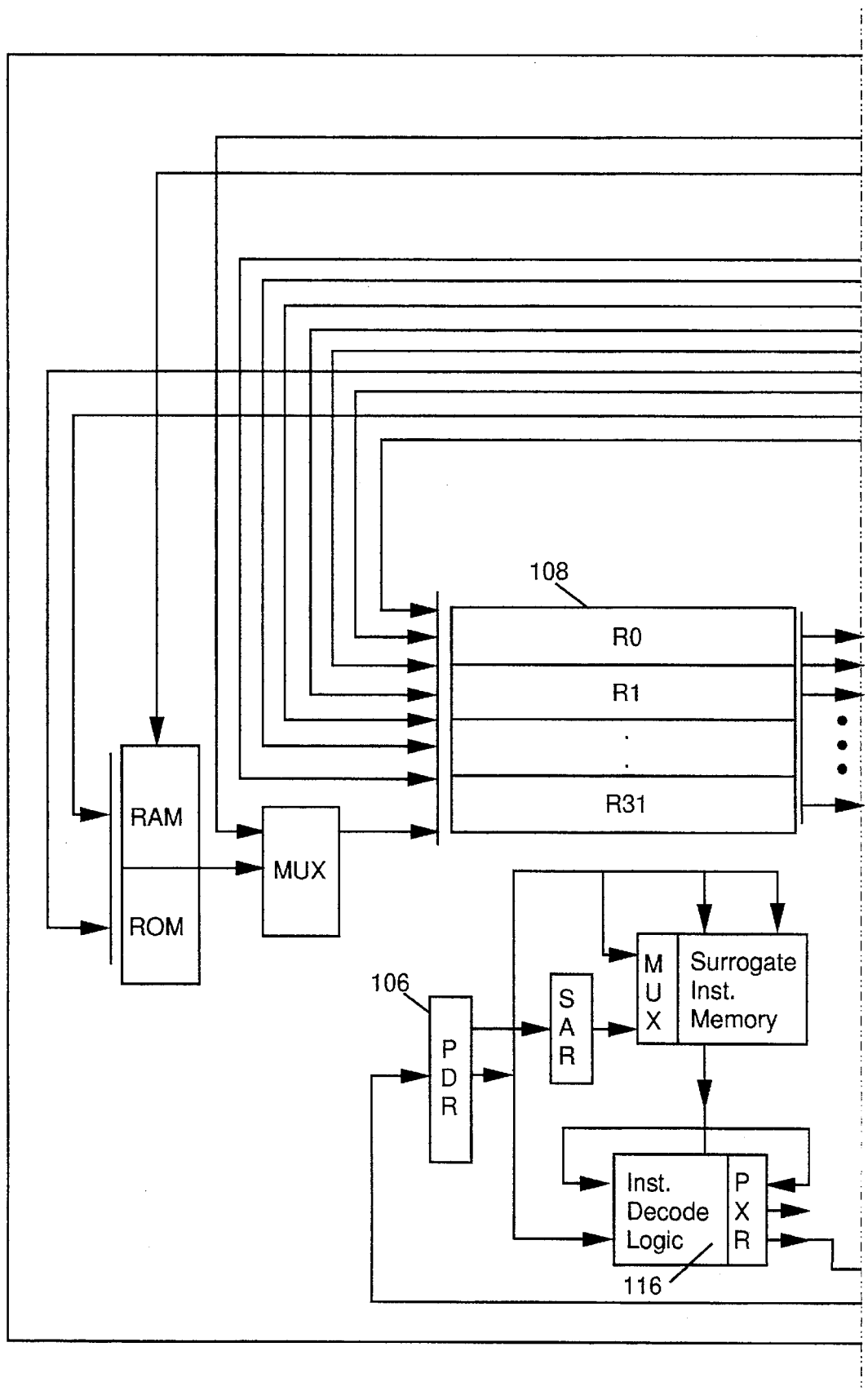
FIG. 4 is a single processor element (diagonal) node flow with connection interfaces.
Figure 4B:
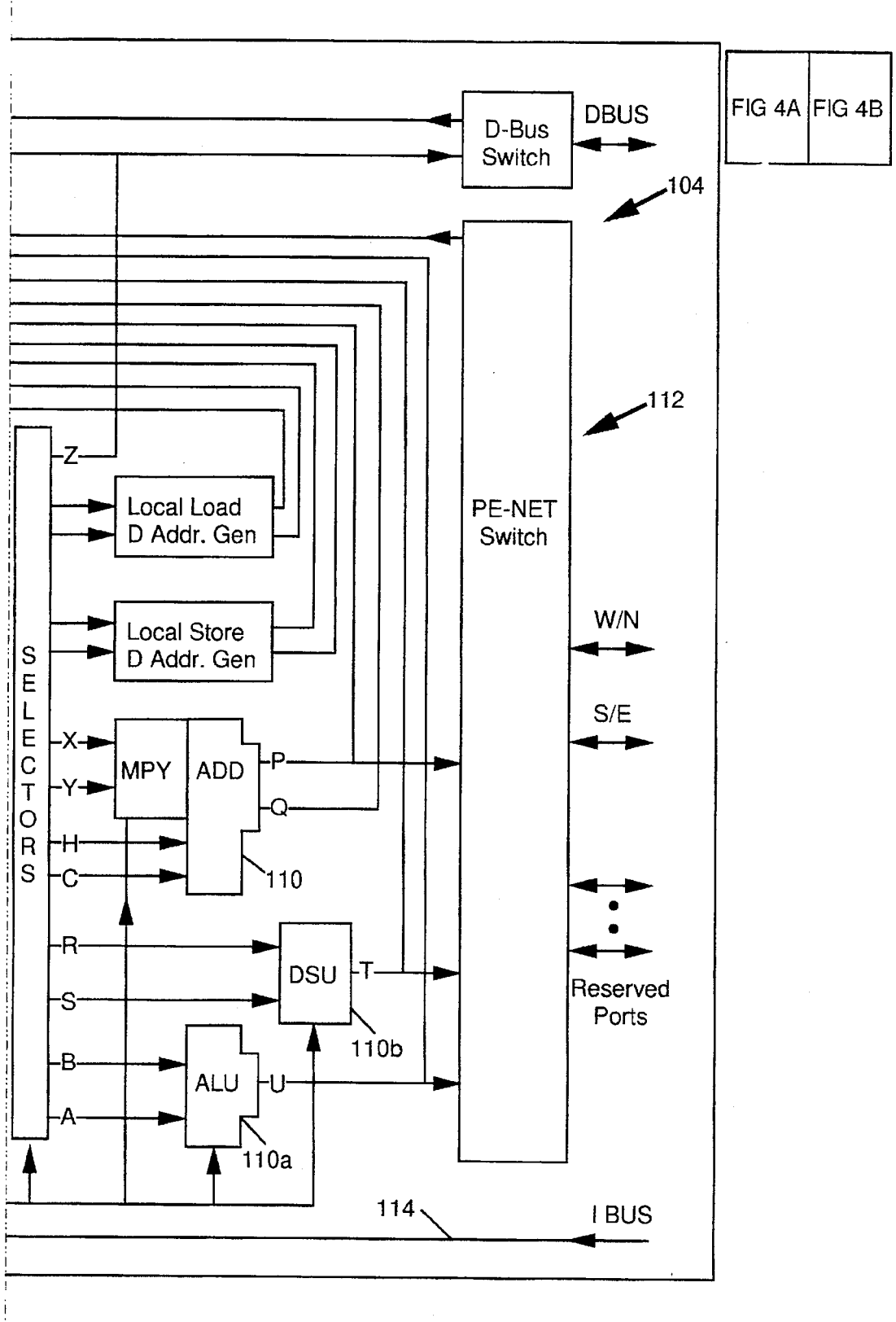
Figure 5A:
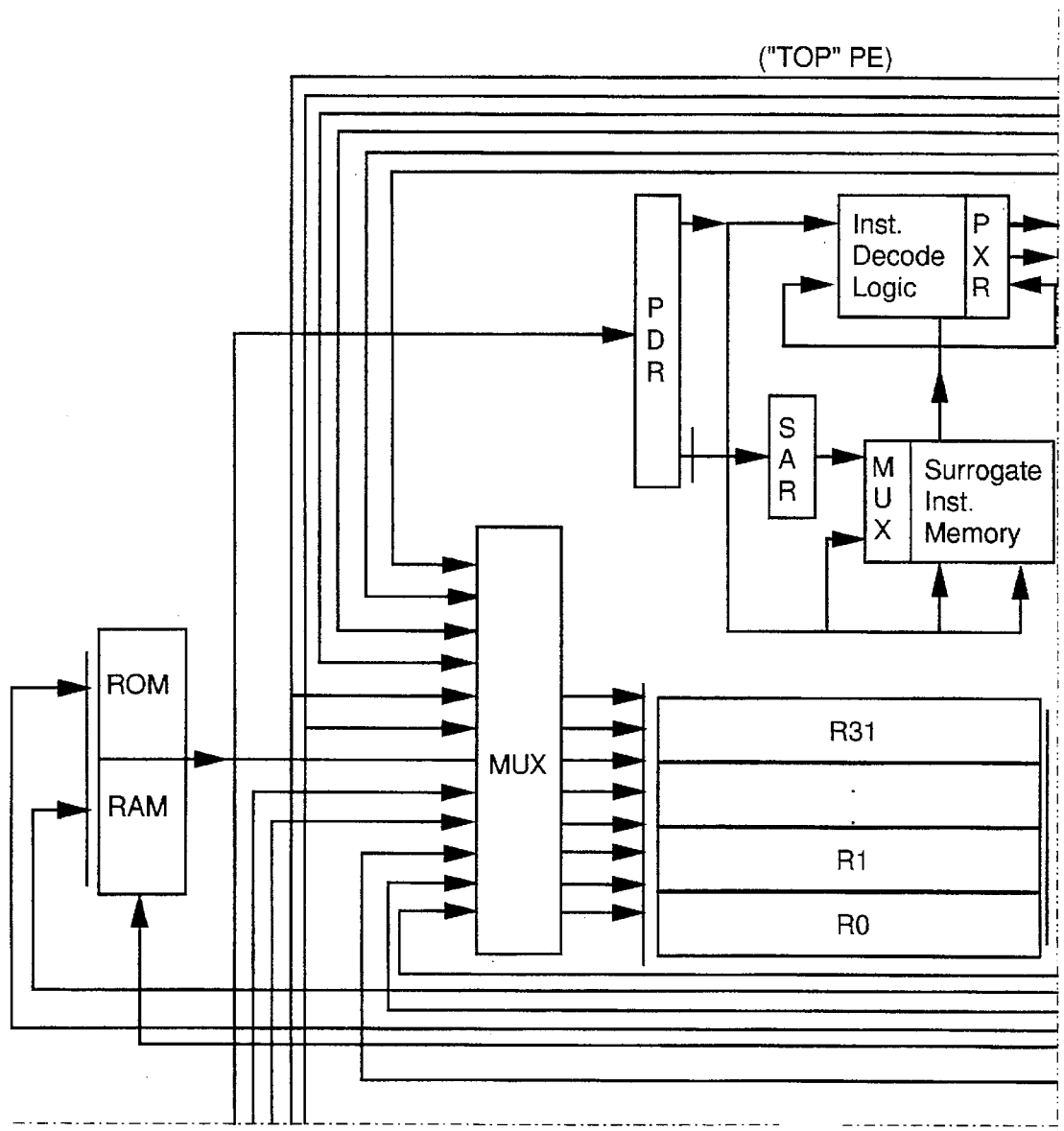
FIG. 5 is a dual processor element node flow with connection interfaces.
Figure 5B:
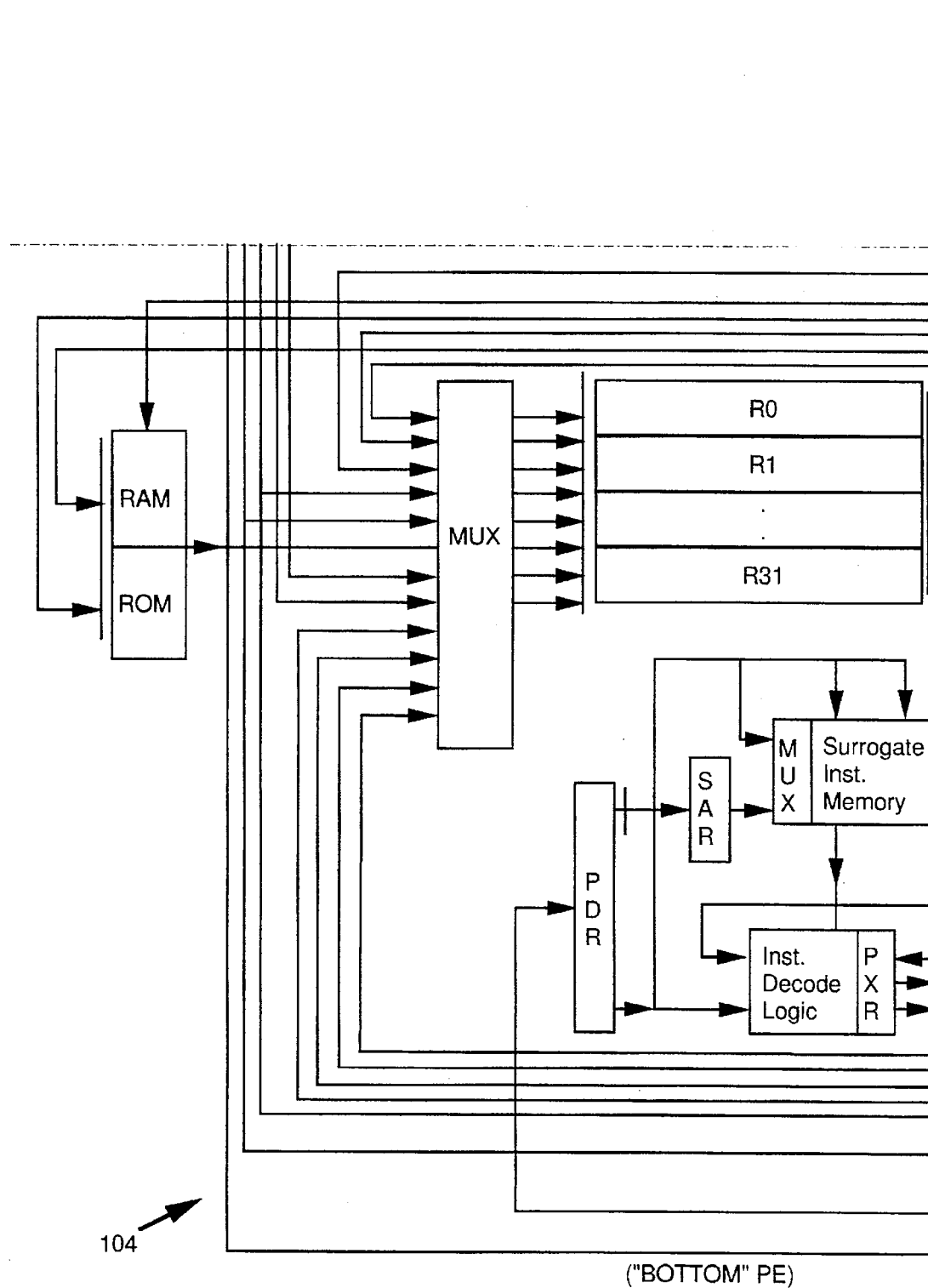
Figure 5C:
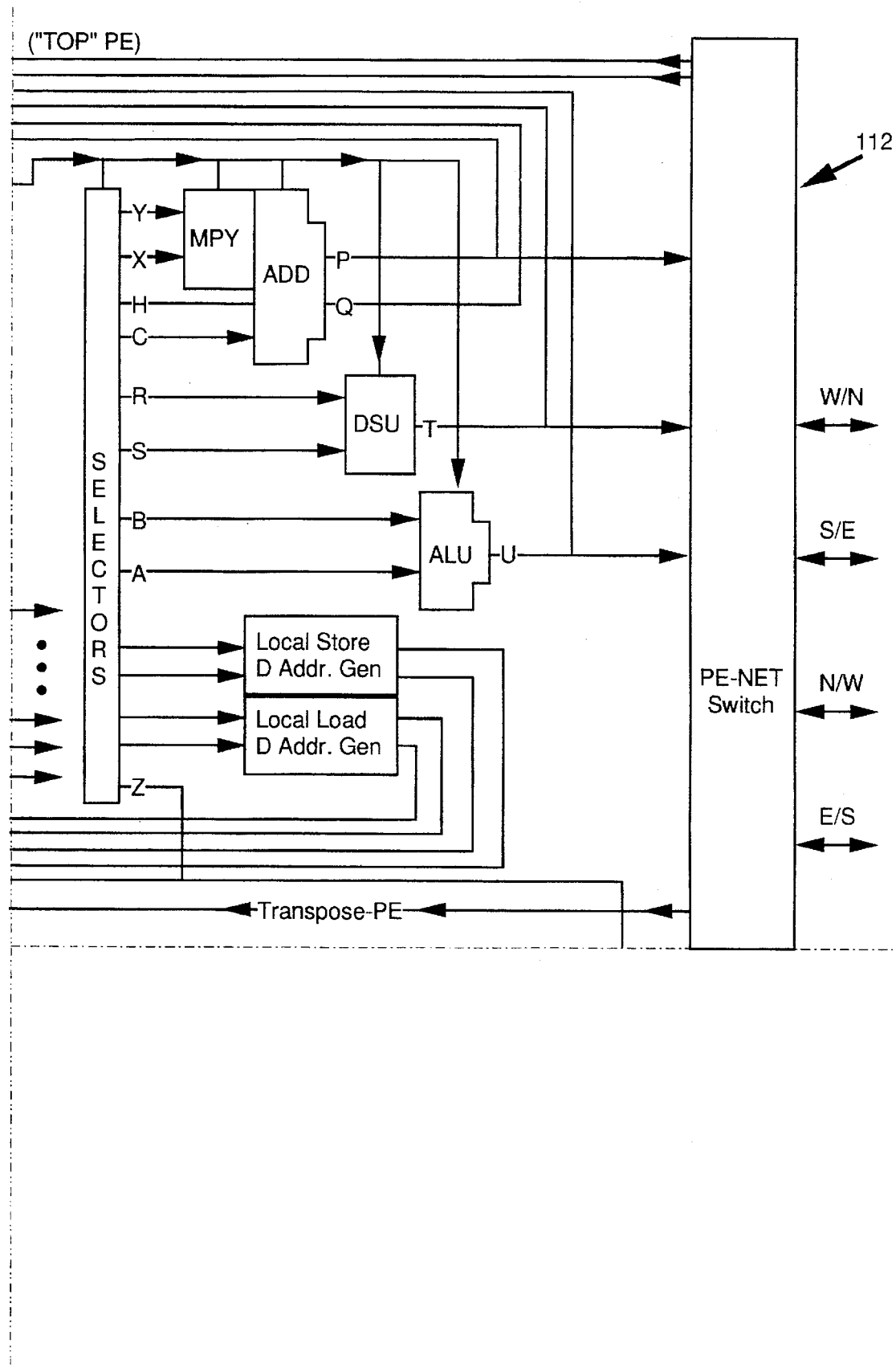
Figure 5D:
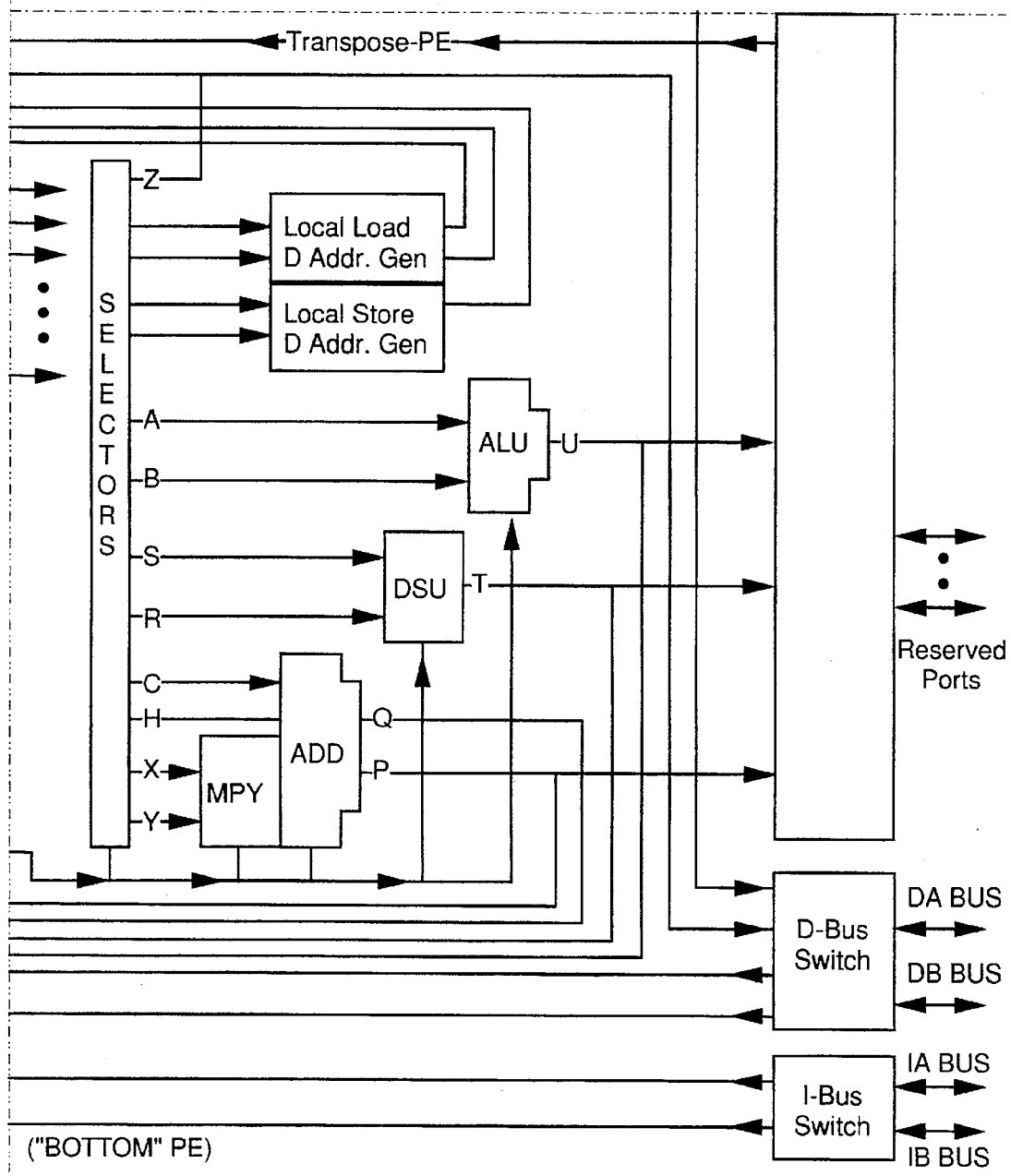

All Processing Elements 104 in FIG. 4 contain a common set of arithmetic flow components, including a fixed point/floating point Multiply/Add Unit (MAU) 110, an ALU 110a, a Data Select Unit (DSU) 110b, and a General Purpose Register File (GPRF) 108 comprising 32 GPRs. Each PE 104 also contains instruction pipeline hardware; PE Decode Register (PDR) 106, instruction decode logic, and PE Execute Register (PXR) to hold instructions being executed by the PE. In addition, a small Surrogate Instruction Memory (SIM) is included in each PE to hold VLIWs which would otherwise specify too many parallel operations to be contained in a 32-bit or simplex instruction word. Logic around the SIM allows for loading the SIM using instructions specifically designed for that purpose. Finally, a local-PE data memory is included for each PE along with associated load and store address generation units.

This common set of flow components is augmented with different switch elements and other logic to create the single-PE node and dual-PE nodes that comprise the folded array.

As noted above, each PE implements its own instruction pipeline logic, including instruction decode and execute registers (their abbreviated names are PDR and PXR) and instruction decode logic. One thing a PE can't do is to determine its own instruction thread (it has no Instruction Address Register and associated sequencing logic). In a machine, the Sequence Processors (SPs) or control unit 103 serve to accomplish the instruction fetch tasks for both themselves and their associated PEs 104. The PEs connected to a given SP 103 are then fed instructions 115 by the SPs 103. The instructions 115 are broadcast over the instruction bus 114 to all connected PEs. Each PE 104, in turn, registers these instructions (in the PDR) and subsequently decodes and executes them.

Another part of the PE instruction pipeline flow is the Surrogate Instruction Memory, or SIM for short. SIM (which may be a combination of RAM and ROM) is included to allow the PEs to execute VLIWs (instructions which cause execute actions in multiple flow elements). Instructions of this type tend to be more complicated than ordinary instructions, and generally will require more bits to represent than are available in a single PE instruction word. In order to circumvent this restriction, a technique is proposed whereby a VLIW instruction is represented in an instruction stream by a surrogate, or place holder instruction. Then, when the surrogate is seen in the instruction stream (by logic in the PE), a VLIW specified by the surrogate is accessed from SIM and executed in place of the surrogate. Other logic in the PE facilitates loading instructions into SIM using specialized instructions. Of course, if some VLIWs are held in ROM, it is never necessary to load them. Some combination of ROM- and RAM-based SIM is probably desirable for most applications.

The communication control is described in the following paragraphs. FIG. 4 shows the flow for a single-PE (diagonal) processing node. As shown in the figure, the node contains the full complement of components provided by a single PE 104 (MAU, ALU, DSU, GPRF, and local-PE data memory), plus switch/select logic to direct nearest-neighbor and D-bus data to and from the registers. The instruction pipeline path logic which is provided allows for orderly decoding and execution of ordinary instructions and surrogate instructions.

The dual-PE node flow proposed for the folded-mesh array (see FIG. 5) contains all the arithmetic elements of two PEs 104 and 104'. That is, it has 2 MAUs, 2 ALUs, 2 DSUs, 2 sets of GPRs, and 2 local-PE data memories. Switching logic 112 common to the 2 PEs allows for 4 nearest-neighbor communication paths, 2 data bus and 2 instruction bus connections. The node halves (they are referred to simply as the Top and Bottom PEs) execute the same broadcast instructions, separately, so each has its own instruction register and decode logic. In order to facilitate communication between the two halves of the dual-PE node, multiplexors on the GPRF input ports allow load data from any source to be written into either GPRF via an instruction destination field specification.

Two mode control registers are provided in each PE to control the basic operational modes in the PEs. The first mode control register contains configuration bits, for example, I-Bus Switch, D-Bus Switch, Nearest-Neighbor/Adjacent-PE Communications Mode, and Ring/Array Mode. The second mode control register contains arithmetic options for Rounding and Saturation control of specific execution unit results. Two PE instructions control the loading of the two registers. The PE Set Mode Instruction controls the configuration bits and loads all PEs with immediate mode control information contained in the instruction. The PE Set Rounding/Saturation Instruction loads the second register.

For the configuration mode register, the I-Bus and D-Bus switches are controlled from the configuration mode register which specifies in the dual PEs how the two IA/IB bus ports and the two DA/DB bus ports are connected to the top and bottom PE. Using these switch settings the I-buses and D-buses can be connected to the array row PEs or the column PEs. Additional mode bits indicate whether the PEs are in a Nearest Neighbor or Adjacent-PE Communications mode. Mode information must also be provided for how the PE-to-PE interface is to be used when independent row rings or column rings are used, since the nearest neighbor/Adjacent-PE interface is modified accordingly. The following lists the operational mode bit definitions.

I-Bus Switch
    0 = IA-Bus Port connects to the Top PE, IB-Bus Port connects to the Bottom PE
    1 = IA-Bus Port connects to the Bottom PE, IB-Bus Port connects to the Top PE
D-Bus Switch
    0 = DA-Bus Port connects to the Top PE, DB-Bus Port connects to the Bottom PE
    1 = DA-Bus Port connec to the Bottom PE, DB-Bus Port connects to the Top PE
Nearest Neighbor/Adjacent-PE Communications Mode
    0 = Nearest Neighbor Communications Enabled
    1 = Adjacent-PE Communications Enabled -continued Ring/Array Mode
    00 = Row Rings: N and S Ports Disabled, E and W Ports Enabled
    01 = Column Rings: E and W Ports Disabled, N and S Ports Enabled
    10 = Reserved
    11 = Array Mode The PE flow diagrams depicted in FIG. 4 and FIG. 5 show switches which are controlled from instructions being executed. Three types of switches are indicated in the nodes: the PE-NET Switch, Data-Bus (D-Bus) Switch, and Instruction-Bus (I-Bus) switch (only in the dual-PE node). The PE-NET switches are controlled by instructions executing in the PEs; the I-Bus and D-Bus switches are controlled by the PE-mode control register. The PEs exchange data in different ways among nodes by controlling the PE-NET switches.

The Nearest-Neighbor (PE-NET) transmitting/receiving facilities for dual-PE nodes include four bi-directional or four separate input and four separate output driver/receiver ports. For the separate input/output port case, there is an input and output pair assigned to each nearest neighbor communication direction. In general, when one of these ports is assigned to transmit data to a directly attached PE, e.g., nearest-neighbor PE, another port will also be directed to simultaneously receive data from a different PE. In the dual-PE node, Controls are provided to assure that only two of the driver/receiver ports are simultaneously transmitting data and two others are simultaneously receiving data. There are four specific cases to consider: they are Transmit East Receive West, Transmit North Receive South, Transmit South Receive North, and Transmit West Receive East. The diagonal PEs (FIG. 4) share the West/North ports and the South/East ports and thus require only two nearest-neighbor type I/O ports per diagonal PE. Note that in the dual-PE nodes, the receiving/transmitting mechanisms consist of four I/O ports.

Figure 7A:
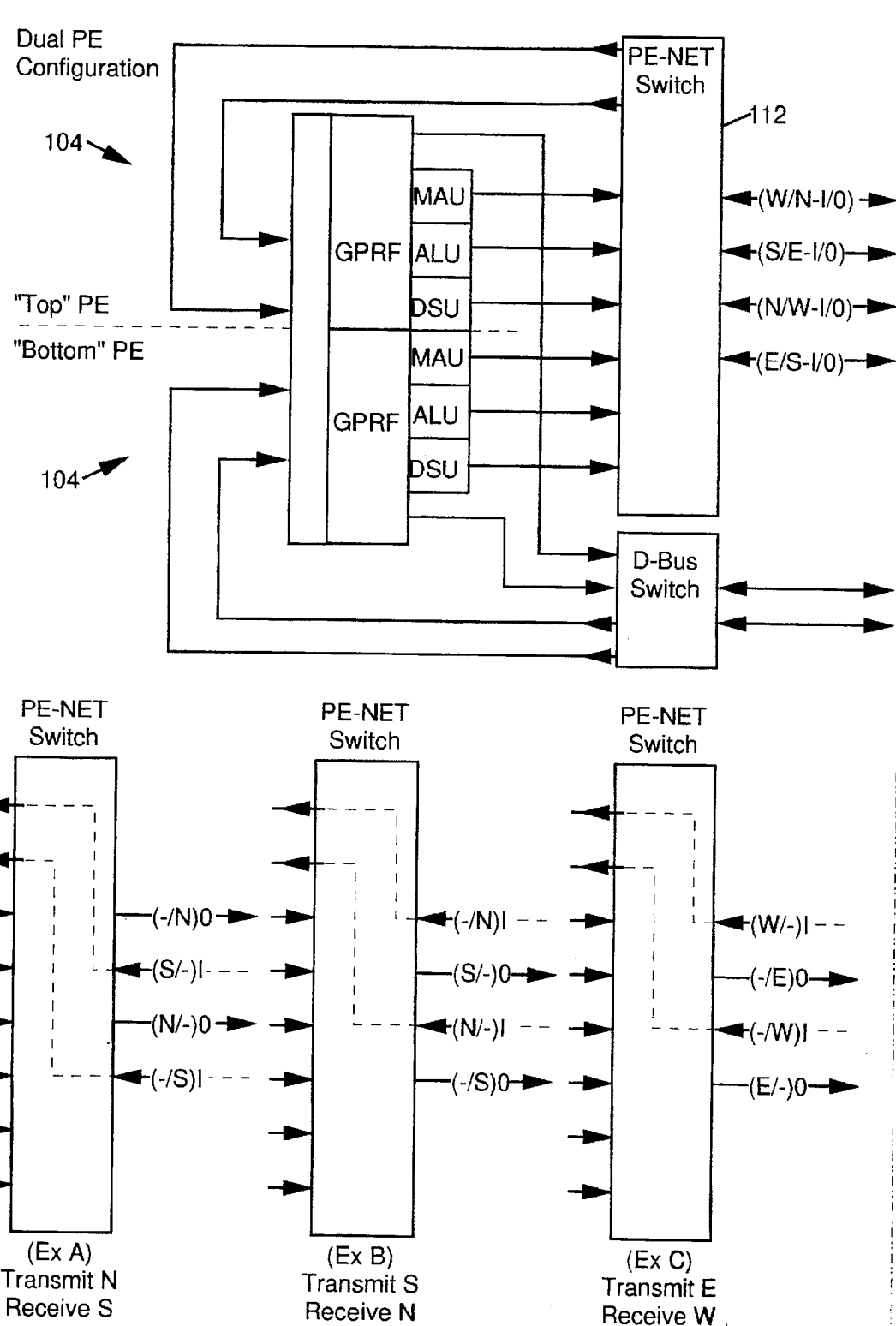
FIG. 7 is a nearest-neighbor communication example in a dual processor element node.
Figure 7B:
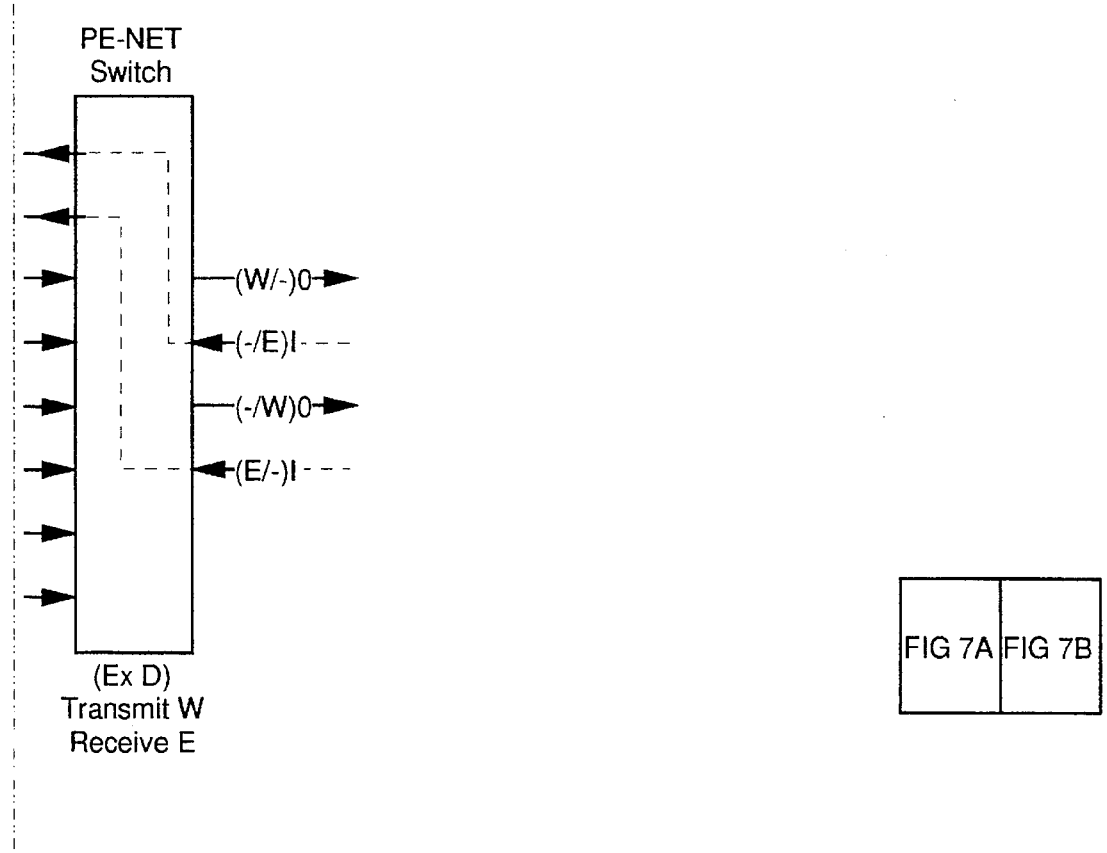

FIG. 6 and FIG. 7 depict the single-PE and dual-PE nodes in a less detailed form than FIG. 4 and FIG. 5 and show examples of how the nearest-neighbor ports are used in supporting four possible transmission modes. The communication modes supported cause data to be transmitted in the four cardinal directions and simultaneously received from the opposite direction. For example, transmit North and receive from the South.

Figure 8B:
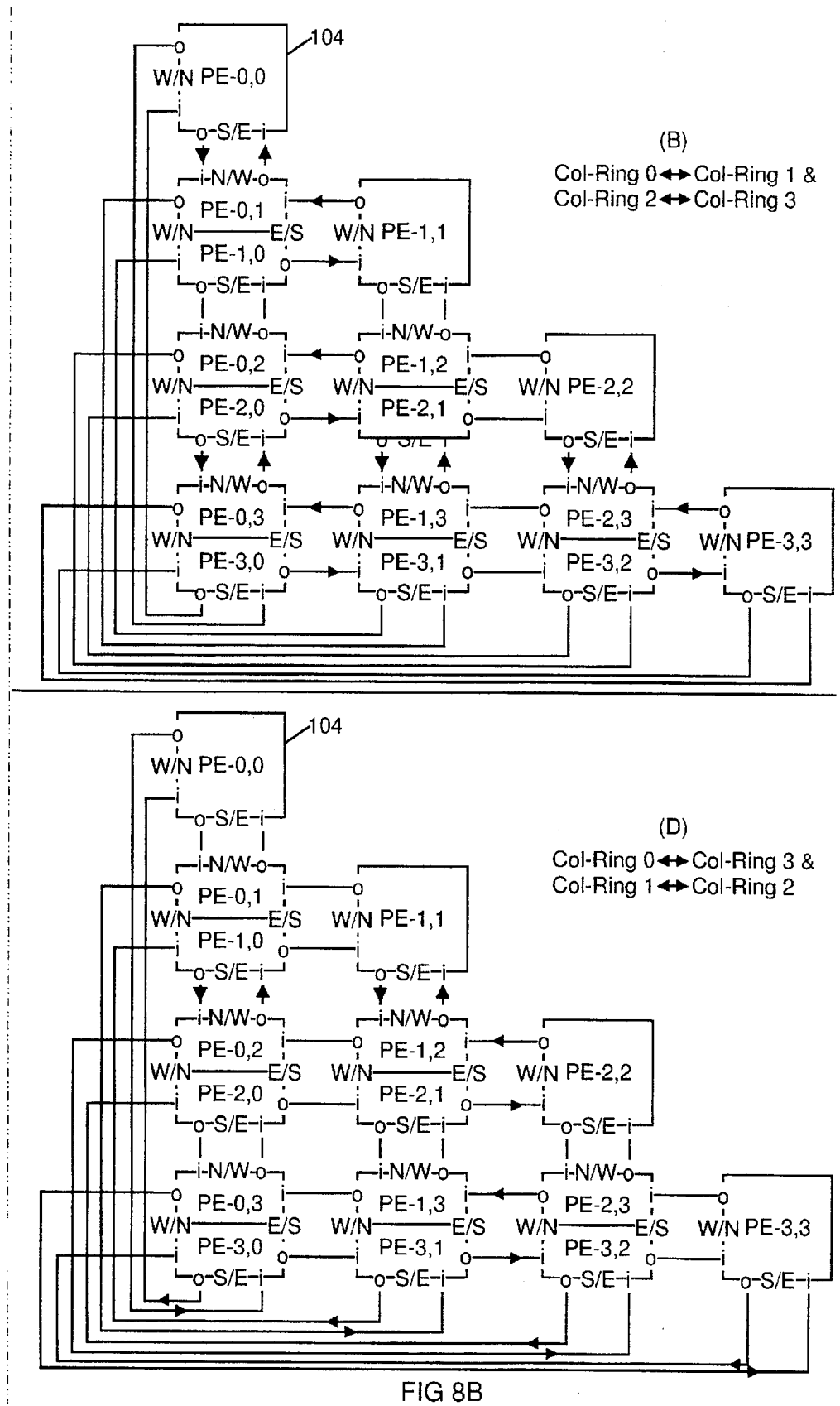
FIG. 8 is a logical and folded mesh representation of adjacent processor element column communications.

FIG. 8 and FIG. 9 depict, for a four neighborhood array, the logical representation (i.e. on the unfolded mesh) and the folded mesh representation of the adjacent PE, four communications modes possible:

Col-Ring 0 -- Col-Ring 1 & Col-Ring 2 -- Col-Ring 3 FIGS. 8A and 8B.

Col-Ring 0 -- Col-Ring 3 & Col-Ring 1 -- Col-Ring 2 FIGS. 8C and 8D.

Row-Ring 0 -- Row-Ring 3 & Row-Ring 1 -- Row-Ring 2 FIGS. 9C and 9D.

Row-Ring 0 -- Row-Ring 1 & Row-Ring 2 -- Row-Ring 3 FIGS. 9A and 9B.

Figure 10:
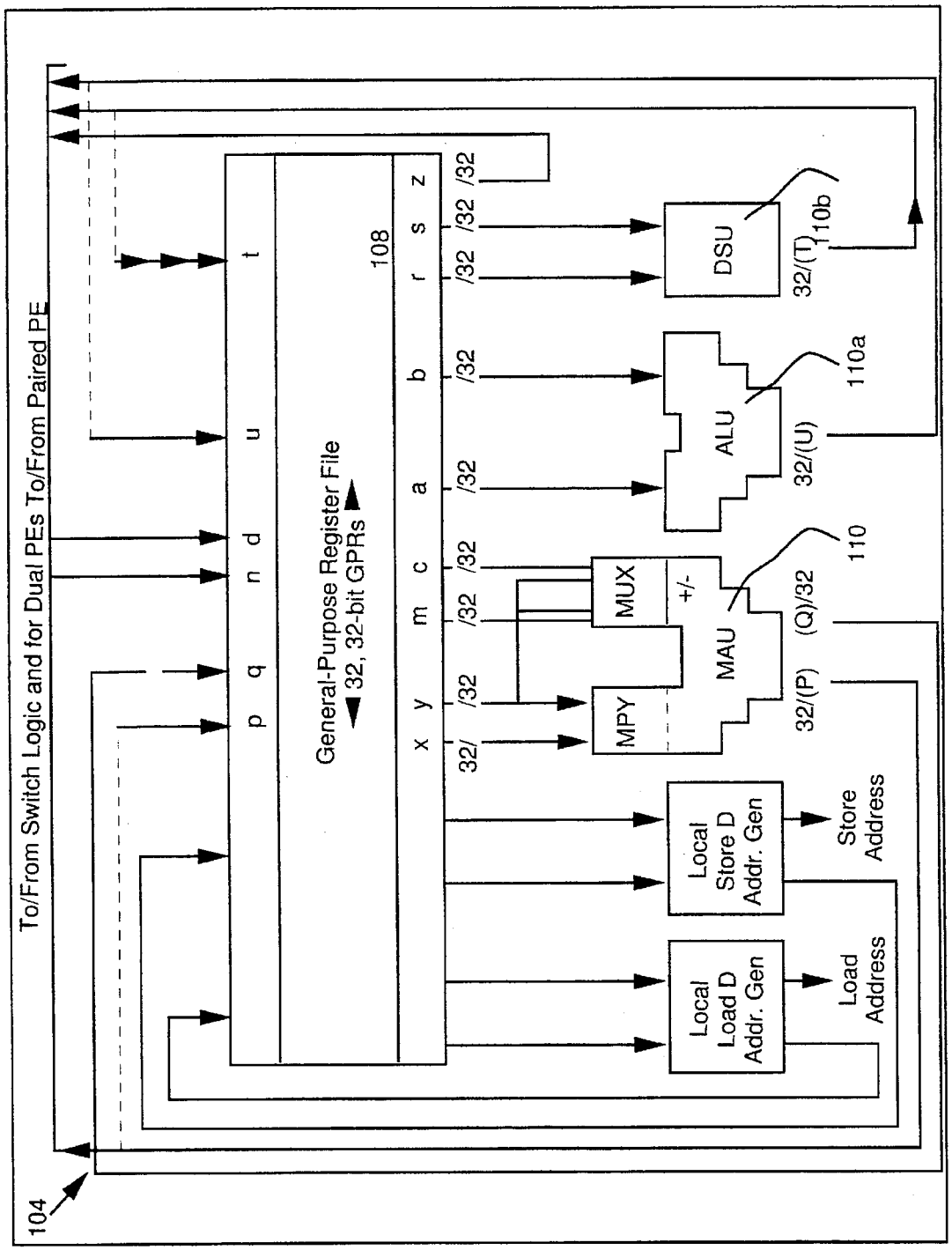
FIG. 10 is a flow organization of a processing dement, depicting the flow of an individual processing element, showing all its arithmetic facilities and the points to find for connection to switch logic and paired processor elements.

The folded-array nodes each contain one or two Processing Elements as shown in FIG. 4 and FIG. 5. The PEs, which are all identical, each contain two general types of arithmetic units: an ALU and a fixed point/floating point Multiply/Add Unit (MAU), a Data Selection Unit (DSU), a Local Load Data Address Generator, a Local Store Data Address Generator, and a set of 32 GPRs which serves to hold operands and working results for operations performed in the node. The register set is referred to as the General Purpose Register File, or GPRF for short. A view of the PE data flow organization, showing its individual processing elements and GPR file, is shown in FIG. 10.

Three classes of Multiply/Add Unit MAU instructions are architectured, one for 16×16 single 32-bit fixed point results, a second for 32×32/dual-16×16 double 32-bit fixed point results, and a third for Single Precision Real floating point multiply-add results. An array processor can be designed to support any one of these options and operate as subsets of the full architecture. With a 64-bit result (or double 32-bit results) the low 32-bit half uses bus Q. For an implementation with a 16×16 MAU only, the Q bus is not used. For a 32-bit array processor the 32×32 MAU instructions are only able to write their results back to a local GPRF. The DEST destination field is not used in 32×32 MAU instructions and the second 32-bit result is written back to the target register specified plus one. Use of the clustered communications and nearest neighbor interface for the 32×32 MAU instructions is reserved for future machines with 64-bit Nearest Neighbor ports. Note that the Processing Element flow does not include any of the switch logic required for communication among array nodes; that logic is unique to the nodes themselves. The idea, here, is that the logic for the PE can be designed as a macro and used repeatedly to build the array. It is intended for the PE to be designed with 6 unconnected GPRF input ports, and allow these inputs to be connected in the manner appropriate for the particular node in which the PE is included. FIG. 10 indicates typical direct connections (shown in dashed lines) from the ALU, MAU, and DSU. A more complete picture of these direct connections is shown in the Single-PE node flow diagram (FIG. 4).

The GPRF input ports may also be multiplexed as shown in the Dual-PE node flow diagram (FIG. 5).

Figure 11:
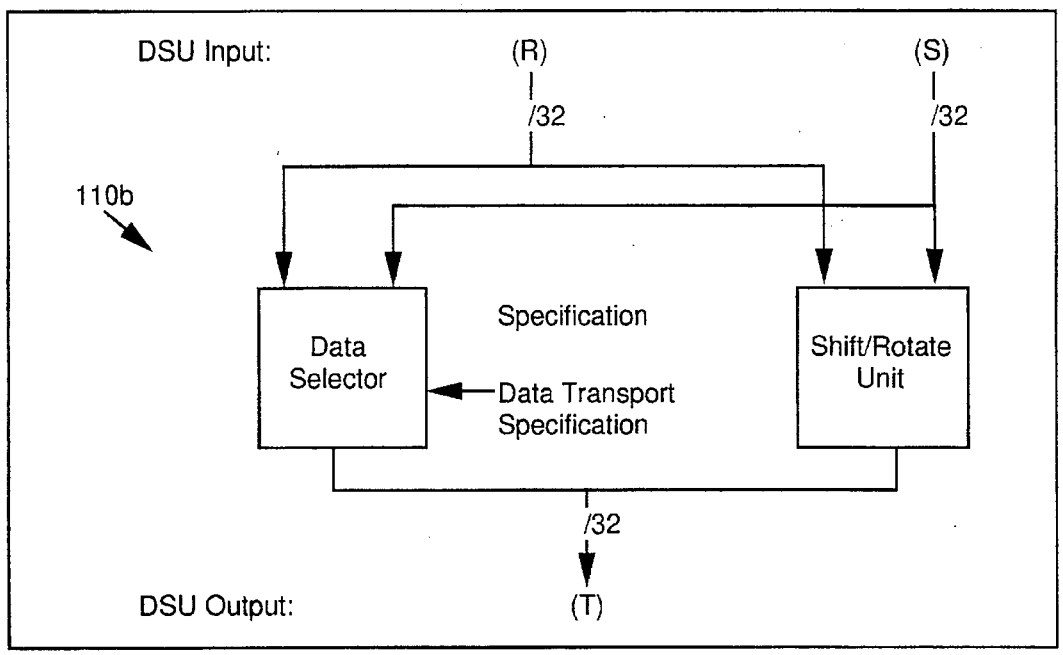
FIG. 11 is a general form diagram of the data select unit.
Figure 12:
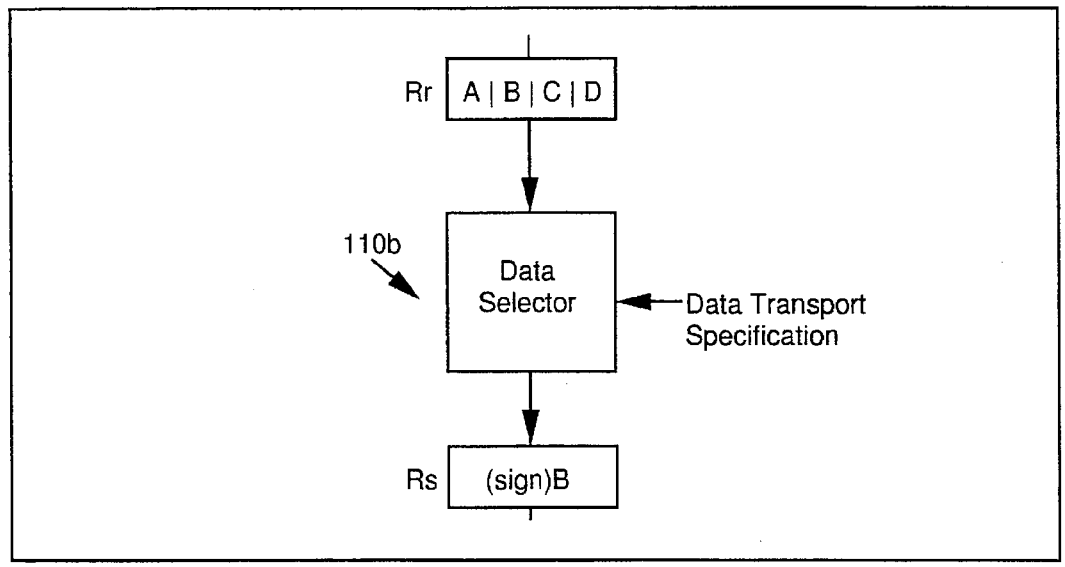
FIG. 12 is an example of a data select unit in use, wherein byte B of the source is placed in the low order 8 bits of the destination register and all the remaining destination bits are forced to be the same as the sign of the byte, as performed by the data selector logic.

The Data Select Unit (DSU) is used in register-to-register moves and data shift operations. In the specific situation when the move destination is also the source for another move (registers are co-destinations between paired-PEs), a SWAP function can be achieved. The general form of the DSU is shown in FIG. 11:

The logic in the Data Selector is used to modify the data passing from source to destination for those instructions which require it. For example, when a byte is selected from the source register and then loaded into the destination in sign-extended form, the Data Selector will perform the byte-alignment and sign-extension functions. A simple example of this kind of operation is shown in FIG. 12.

Three types of data select/move operations are provided by the Data Selector: word move, halfword move, and byte move. Within these types of moves, certain variations are supported:

Word move
Halfword move
    Any source halfword to any destination halfword
    Any source halfword to low half of word and:
        High halfword forced to all zeros
        High halfword forced to all ones
        High halfword forced to low halfword sign value
Byte move
    Any source byte to any destination byte
    Any source byte to low destination byte and:
        High bytes forced to all zeros
        High bytes forced to all ones
        High bytes forced to low byte sign value
    High or low source byte pairs (b0 and b1, b2 and b3) to destination bytes b1 and b3,
and:
        High bytes forced to all zeros
        High bytes forced to all ones
        High bytes forced to low byte sign value When a PE execution unit performs operations, the resulting output (P, U, and/or T) is sent to a destination register which may be in the same PE as the execution unit (a local register), in a paired-PE (in a dual-cluster PE node), or in any directly attached PE. In all cases, the target register 126 in FIG. 2 is specified in conjunction with the instruction's Destination (DEST) field 120. Table 1 and Table 2 list the destination (DEST) options presently defined. This field may be modified for specific instructions. For surrogate instructions only one execution unit is specified to use the nearest neighbor interface.

A folded array 2 dimensional (2D) discrete cosine transform is presented next.

Figure 13:
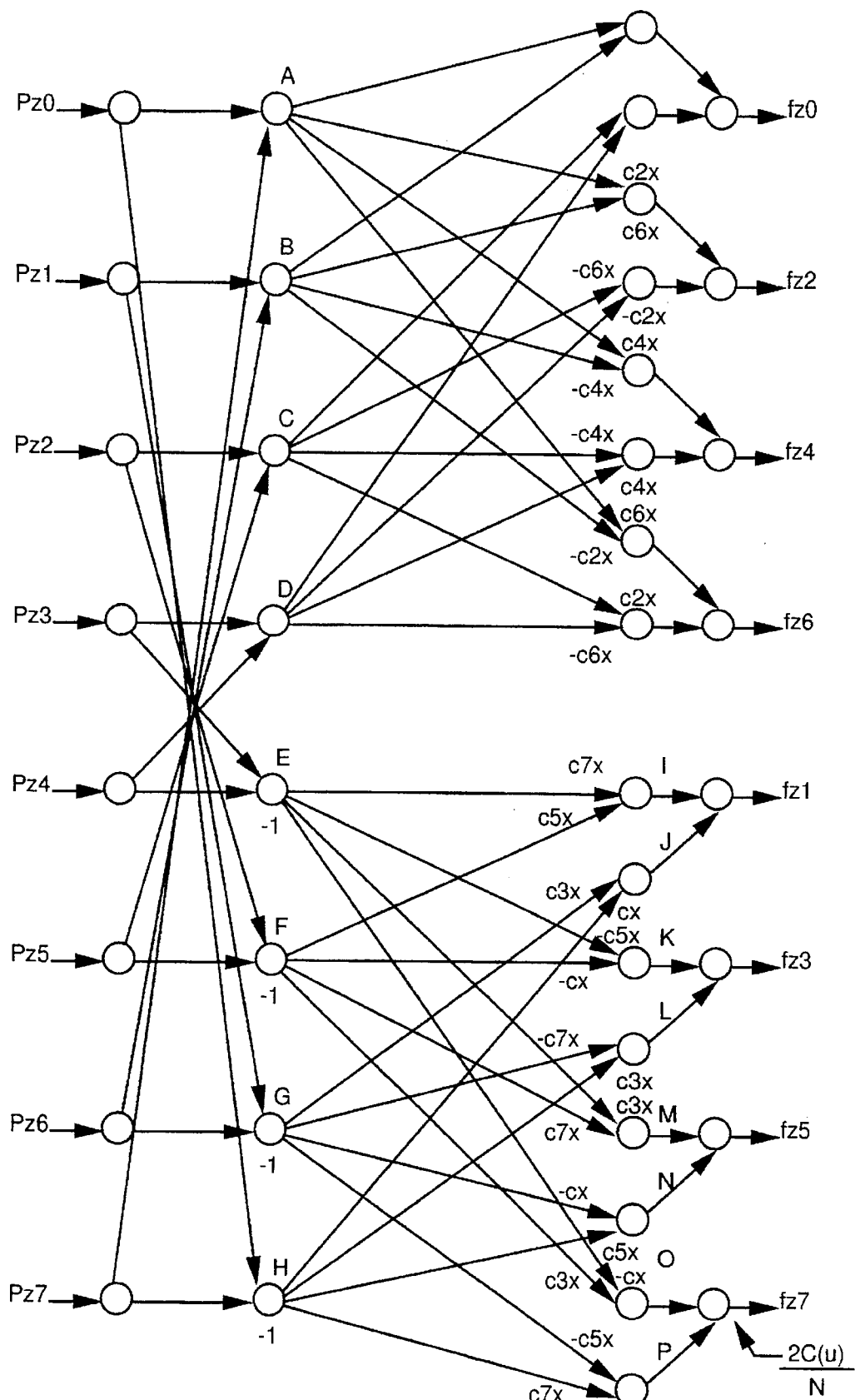
FIG. 13 is a flow chart showing folded array fast odd/even symmetric 1-D DCT.

The signal flow graph for the symmetric discrete cosine transform (DCT) is shown in FIG. 13. Note that the outputs are scaled by the $2C(u)/N$ where $C(u)=1/\sqrt{2}$ for $u=0$ and $C(u)=1$ otherwise. Note that $c\#x=\cos(\#pi/16)$ and that $1/(4\sqrt{2})=\frac{1}{4}c4x$.

Figure 18:
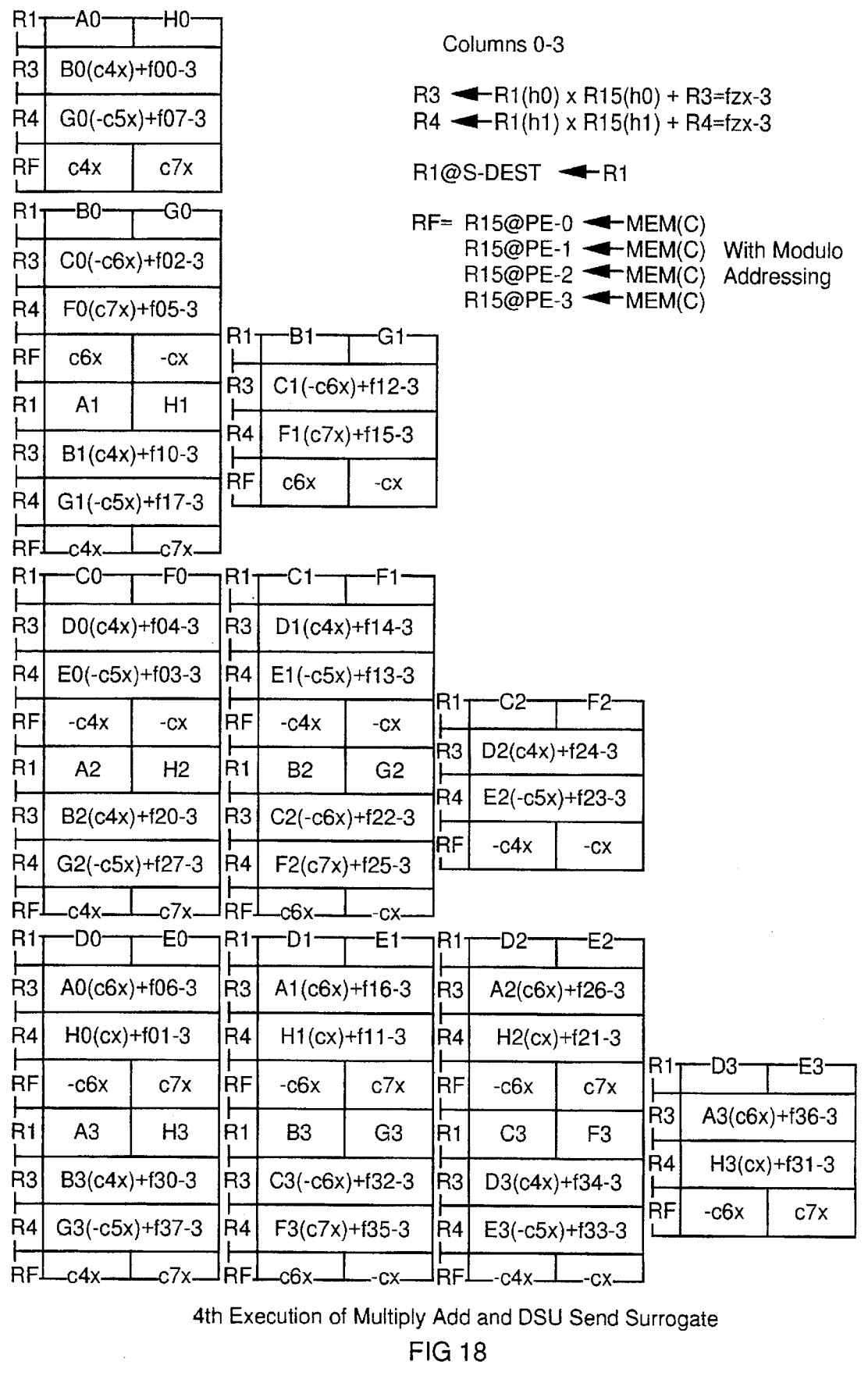

For the 2-D DCT a 1-D DCT on the columns followed by a 1-D DCT on the Rows produces the 2-D DCT result. A multiplication accumulate and register transfer via the nearest neighbor ports procedure is used. Since the butterfly results are 16-bits and the nearest neighbor ports are 32-bits both odd and even butterfly values can be sent between PEs each cycle. With dual 16×16 multipliers in each PE both odd and even parts of the 1-D DCT for 4-columns can be calculated in the same four cycles. The column 1-D DCT equations shown in Table 3. The lower case "z" in the following lists represents the column # being processed. FIG. 14 illustrates the execution of the butterfly surrogate. FIG. 15 illustrates the first execution of the multiply add and DSU send surrogate. FIG. 16 illustrates the second execution of the multiply add and DSU send surrogate. FIG. 17 illustrates the third execution of the multiply add and DSU send surrogate. FIG. 18 illustrates the fourth execution of the multiply add and DSU send surrogate. FIG. 19 illustrates the execution of the butterfly with the clustered processor element destination surrogate.

Another 4-cycles finishes all 8-column 1-D DCTs. The scaling of the output can be done by a number of different, known methods and not discussed further here. The procedure continues with doing the 1-D DCT on the row values. First a half-word butterfly surrogate instruction creates all the row butterfly values placing the values in the pattern shown in FIG. 19 where "z", of Az through Hz, represents the row # now instead of the column #. Note that the half-word butterfly instructions send their results to the paired-PE register instead of a local register. This is a communication operation between the dual PEs used to ensure the data lines up with the coefficients.

$$Az = f0z + f7z$$
$$Bz = f1z + f6z$$
$$Cz = f2z + f5z$$
$$Dz = f3z + f4z$$
$$Ez = f3z - f4z$$
$$Fz = f2z - f5z$$
$$Gz = f1z - f6z$$
$$Hz = f0z - f7z$$

Next a sequence of eight multiply-add-send operations are completed followed by a scaling (shift) operation to conclude the 2-D DCT. Note that the rows are done in a different order than the columns were done. With the even rows in the first set of four 32 multiplication operations followed by the odd rows in the second set of four 32 multiplications. In the first 1-D DCT columns 0–3 were done first followed by columns 4–7. The end result is the same accomplishing the 2-D DCT on the whole 8×8 array. In the JPEG and MPEG algorithms a quantization step follows the 2-D DCT, in which case the scaling step can be included in the quantization step. The total number of cycles for an 8×8 2-D DCT (excluding scaling) is 18 cycles.

The problems and how they are solved summary:

1. provide a programmable low latency communication mechanism between processing elements in an array of processing elements, The specification of the destination of results from functional execution units is changed from always the local processor's storage (register file), to any direct attached processor's storage (register file).

2. pipeline across the array of processing elements,

Due to the communication of results between processing elements with zero latency, computations can be pipelined across the array of processing elements.

3. communicate between clustered processing elements.

Specialized Data Select Unit instructions and expansion of the direct attached destination specification to include clustered processing elements provides the zero latency communications between the clustered processing elements and the ability to pipeline across the total interconnected array.

Although a specific embodiment of the invention has been disclosed, it will be understood by those having skill in the art that changes can be made to that specific embodiment without departing from the spirit and the scope of the invention.

TABLE 1

Nearest Neighbor Result Destination (For X substitute P/U/S)

| DEST | Single-PE Action | Dual-PE Action |
|---|---|---|
| 0000 | local GPRF Register ← X | local GPRF Register ← X |
| 0001 | local GPRF Register ← X | Transpose-PE GPRF Register ← X |
| 0010 | Hyper-cube Complement-PE GPRF Register ← X | Hyper-cube Complement-PE GPRF Register ← X |
| 0011 | Reserved for Clustered Destinations | Reserved for Clustered Destinations |
| . | Reserved for Clustered Destinations | Reserved for Clustered Destinations |
| . | | |
| . | | |
| 0111 | Reserved for Clustered Destinations | Reserved for Clustered Destinations |
| 1000 North | • W/N Out Port ← Local-X<br>• TRGT Register ← S/E In Port South-X | • N/W Out Port ← Local-Xt<br>• Top-PE TRGT Reg ← S/E In Port South-Xt<br>• W/N Out Port ← Local-Xb<br>• Bot-PE TRGT Reg ← E/S In Port South-Xb |
| 1001 North East | Reserved (e.g. 8-NN: NE port) | Reserved (e.g. 8-NN: NE port) |
| 1010 East | • S/E Out Port ← Local-X<br>• TRGT Register ← W/N In Port West-X | • E/S Out Port ← Local-Xt<br>• Top-PE TRGT Reg ← W/N In Port West-Xt<br>• S/E Out Port ← Local-Xb<br>• Bot-PE TRGT Reg ← N/W In Port West-Xb |
| 1011 South East | Reserved (e.g. 8-NN: SE port) | Reserved (e.g. 8-NN: SE port) |
| 1100 South | • S/E Out Port ← Local-X<br>• TRGT Register ← W/N In Port North-X | • S/E Out Port ← Local-Xt<br>• Top-PE TRGT Reg ← N/W In Port North-Xt<br>• E/S Out Port ← Local-Xb<br>• Bot-PE TRGT Reg ← W/N In Port North-Xb |
| 1101 South West | Reserved (e.g. 8-NN: SW port) | Reserved (e.g. 8-NN: SW port) |
| 1110 West | • W/N Out Port ← Local-X<br>• TRGT Register ← S/E In Port East-X | • W/N Out Port ← Local-Xt<br>• Top-PE TRGT Reg ← E/S In Port East-Xt<br>• N/W Out Port ← Local-Xb<br>• Bot-PE TRGT Reg ← S/E In Port East-Xb |
| 1111 North West | Reserved (e.g. 8-NN: NW port) | Reserved (e.g. 8-NN: NW port) |

Note:
Single-PE nodes have two nearest-neighbor ports and Dual-PE nodes have four such ports. Use of these is depicted in FIG. 6 on page 10 and FIG. 7 on page 11 respectively. The notation Xt and Xb refers to the "top" and "bottom" PEs in a Dual-PE node shown in FIG. 7 on page 11.

TABLE 2

Adjacent-PE Result Destination (For X substitute P/U/S)

| DEST | Single-PE Action | Dual-PE Action |
|---|---|---|
| 0000 | local GPRF Register ← X | local GPRF Register ← X |
| 0001 | local GPRF Register ← X | Transpose-PE GPRF Register ← X |
| 0010 | Hyper-cube Complement-PE GPRF Register ← X | Hyper-cube Complement-PE GPRF Register ← X |
| 0011 | Reserved for Clustered Destinations | Reserved for Clustered Destinations |
| . | Reserved for Clustered Destinations | Reserved for Clustered Destinations |
| . | | |
| . | | |
| 0111 | Reserved for Clustered Destinations | Reserved for Clustered Destinations |
| 1000 North | Even Row PEs<br>• W/N Out Port ← Local-X<br>• TRGT Register ← W/N In Port North-X<br>Odd Row PEs<br>• S/E Out Port ← Local-X<br>• TRGT Register ← S/E In Port South-X | Even Row PEs<br>• N/W Out Port ← Local-Xt<br>• Top-PE TRGT Reg ← N/W In Port North-Xt<br>• W/N Out Port ← Local-Xb<br>• Bot-PE TRGT Reg ← W/N In Port North-Xb<br>Odd Row PEs |

TABLE 2-continued

Adjacent-PE Result Destination (For X substitute P/U/S)

| DEST | Single-PE Action | Dual-PE Action |
|---|---|---|
| | | • S/E Out Port ← Local-Xt<br>• Top-PE TRGT Reg ← S/E In Port South-Xt<br>• E/S Out Port ← Local-Xb<br>• Bot-PE TRGT Reg ← E/S In Port South-Xb |
| 1001<br>North<br>East | Reserved (e.g. 8-NN: NE port) | Reserved (e.g. 8-NN: NE port) |
| 1010<br>East | Even Column PEs<br>• S/E Out Port ← Local-X<br>• TRGT Register ← S/E In Port East-X<br>Odd Column PEs<br>• W/N Out Port ← Local-X<br>• TRT Register ← W/N In Port West-X | Even Column PEs<br>• E/S Out Port ← Local-Xt<br>• Top-PE TRGT Reg ← E/S In Port East-Xt<br>• S/E Out Port ← Local-Xb<br>• BOt-PE TRGT Reg ← S/E In Port East-Xb<br>Odd Column PEs<br>• W/N Out Port ← Local-Xt<br>• Top-PE TRGT Reg ← W/N In Port West-Xt<br>• N/W Out Port ← Local-Xb<br>• Bot-PE TRGT Reg ← N/W In Port West-Xb |
| 1011<br>South<br>East | Reserved (e.g. 8-NN: SE port) | Reserved (e.g. 8-NN: SE port) |
| 1011<br>South | Even Row PEs<br>• S/E Out Port ← Local-X<br>• TRGT Register ← S/E In Port South-X<br>Odd Row PEs<br>• W/N Out Port ← Local-X<br>• TRGT Register ← W/N In Port North-X | Even Row PEs<br>• S/E Out Port ← Local-Xt<br>• Top-PE TRGT Reg ← S/E In Port South-Xt<br>• E/S Out Port ← Local-Xb<br>• Bot-PE TRGT Reg ← E/S In Port South-Xb<br>Odd Row PEs<br>• N/W Out Port ← Local-Xt<br>• Top-PE TRGT Reg ← N/W In Port North-Xt<br>• W/N Out Port ← Local-Xb<br>Bot-PE TRGT Reg ← W/N In Port North-Xb |
| 1101<br>South<br>West | Reserved (e.g. 8-NN: SW port) | Reserved (e.g. 8-NN: SW port) |
| 1001<br>West | Even Column PEs<br>• W/N Out Port ← Local-X<br>• TRGT Register ← W/N In Port West-X<br>Odd Column PEs<br>• S/E Out Port ← Local-X<br>• TRGT Register ← S/E In Port East-X | Even Column PEs<br>• W/N Out Port ← Local-Xt<br>• Top-PE TRGT Reg ← W/N In Port West-Xt<br>• N/W Out Port ← Local-Xb<br>• Bot-PE TRGT Reg ← N/W In Port West-Xb<br>Odd Column PEs<br>• E/S Out Port ∂ Local-Xt<br>• Top-PE TRGT Reg ← E/S In Port East-Xt<br>• S/E Out Port ← Local-Xb<br>• Bot-PE TRGT Reg ← S/E In Port East-Xb |
| 1111<br>North<br>West | Reserved (e.g. 8-NN: NW port) | Reserved (e.g. 8-NN: NW port) |

Note:
Single-PE nodes have two nearest-neighbor ports and Dual-PE nodes have four such ports. Use of these is depicted in FIG. 6 on page 10 and FIG. 7 on page 11 respectively. The notation Xt and Xb refers to the "top" and "bottom" PEs in Dual-PE node shown in FIG. 7 on page 11.

TABLE 3

1. Butterfly calculation on each column FIG. 14

. $Az = Pz0 + Pz7$
. $Bz = Pz1 + Pz6$
. $Cz = Pz2 + Pz5$

TABLE 3-continued

. $Dz = Pz3 + Pz4$
. $Ez = Pz3 - Pz4$
. $Fz = Pz2 - Pz5$
. $Gz = Pz1 - Pz6$
. $Hz = Pz0 - Pz7$

TABLE 3-continued 2. 1st 32 Multiplies column z = 0–3, Send Column 0–3 Pairs of Butterfly Results South (FIG. 15):

. fz0-1 = Az(c4x)
. fz2-1 = Bz(c6x)
. fz4-1 = Cz(–c4x)
. fz6-1 = Dz(–c6x)
. fz1-1 = Ez(c7x)
. fz3-1 = Fz(–cx)
. fz5-1 = Gz(–cx)
. fz7-1 = Hz(c7x)
. Send (Az,Hz), (Bz,Gz), (Cz,Fz), (Dz,Ez) to South PE 3. 2nd 32 Multiplies column z = 0–3 Pairs of Butterfly Results South (FIG. 16):

. fz0-2 = (fz0-1 = Az(c4x)) + Dz(c4x)
. fz2-2 = (fz2-1 = Bz(c6x)) + Az(c2x)
. fz4-2 = (fz4-1 = Cz(–c4x)) + Bz(–c4x)
. fz6-2 = (fz6-1 = Dz(–c6x)) + Cz(c2x)
. fz1-2 = (fz1-1 = Ez(c7x)) + Fz(c5x)
. fz3-2 = (fz3-1 = Fz(–cx)) + Gz(–c7x)
. fz5-2 = (fz5-1 = Gz(–cx)) + Hz(c5x)
. fz7-2 = (fz7-1 = Hz(c7x)) + Ez(–cx)
. Send (Az,Hz), (Bz,Gz), (Cz,Fz), (Dz,Ez) to South PE 4. 3rd 32 Multiplies column z = 0–3, Send Column 0–3 Paris of Butterfly Results South (FIG. 17):

. fz0-3 = (fz0-2 = Az(c4x) + Dz(c4x)) + Cz(c4x)
. fz2-3 = (fz2-2 = Bz(c6x) + Az(c2x)) + Dz(–c2x)
. fz4-3 = (fz4-2 = Cz(–c4x) + Bz(–c4x)) + Az(c4x)
. fz6-3 = (fz6-2 = Dz(–c6x) + Cz(c2x)) + Bz(–c2x)
. fz1-3 = (fz1-2 = Ez(c7x) + Fz(c5x)) + Gz(c3x)
. fz3-3 = (fz3-2 = Fz(–cx) + Gz(–c7x)) + Hz(c3x)
. fz5-3 = (fz5-2 = Gz(–cx) + Hz(c5x)) + Ez(c3x)
. fz7-3 = (fz7-2 = Hz(c7x) + Ez(–cx)) + Fz(c3x)
. Send (Az,Hz), (Bz,Gz), (Cz,Fz), (Dz,Ez) to South PE 5. 4th 32 Multiplies column z = 0–3, Send Column 0–3 Pairs of Butterfly Results South (FIG. 18):

. fz0-4 = (fz0-3 = Az(c4x) + Dz(c4x) + Cz(c4x)) + Bz(c4x)
. fz2-4 = (fz2-3 = Bz(c6x) + Az(c2x) + Dz(–c2x)) + Cz(–c6x)
. fz4-4 = (fz4-3 = Cz(–c4x) + Bz(–c4x) + Az(c4x)) + Dz(c4x)
. fz6-4 = (fz6-3 = Dz(–c6x) + Cz(c2x) + Bz(–c2x)) + Az(c6x)
. fz1-4 = (fz1-3 = Ez(c7x) + Fz(c5x) + Gz(c3x)) + Hz(cx)
. fz3-4 = (fz3-3 = Fz(–cx) + Gz(–c7x) + Hz(c3x)) + Ez(–c5x)
. fz5-4 = (fz5-3 = Gz(–cx) + Hz(c5x) + Ez(c3x)) + Fz(c7x)
. fz7-4 = (fz7-3 = Hz(c7x) + Ez(–cx) + Fz(c3x)) + Gz(–c5x)
. Send (Az,Hz), (Bz,Gz), (Cz,Fz), (Dz,Ez) to South PE

What is claimed is:

1. A data processing system, comprising:

a storage means for storing a plurality of instructions, each instruction including a first designation of a source register, a second designation of an execution unit operation, a third designation of an execution unit to output port routing, and a fourth designation of an input port to target register routing;

a plurality of processing elements, each coupled by means of an instruction bus to said storage means, each of said processing elements receiving one of said instructions broadcast over said instruction bus;

each of said processing elements comprising:

an instruction register coupled to said instruction bus, for receiving said broadcast instruction;

a register file coupled to said instruction register, said register file including a target register and a first operand register which stores a first operand;

an execution unit coupled to said instruction register, said first instruction designation controlling selective coupling of said first operand register said execution unit to provide to it said first operand;

said second instruction designation controlling said execution unit to execute an operation on said first operand to produce a result operand;

at least a first and a second output ports having outputs respectively coupled to a first and a second succeeding ones of said processing elements;

a switching means coupled to said instruction register, said third instruction designation controlling said switching means to selectively couple said execution unit to either the first output port or the second output port, to provide said result operand to the first succeeding processing element or to the second succeeding processing element, respectively;

at least a first and a second input ports having inputs respectively coupled to a first and a second preceding ones of said processing elements, the first input port adapted to receive a first next operand from the first preceding processing element and the second input port adapted to receive a second next operand from the second preceding processing element; and said fourth instruction designation controlling said switching means to selectively couple said target register to either said first one of said input ports, to provide said first next operand to said target register or said second one of said input ports, to provide said second next operand to said target register;

whereby single instruction, multiple data processing can be performed.

2. The data processing system of claim 1, wherein said first succeeding processing element further comprises:

a second instruction register coupled to said instruction bus, for receiving said broadcast instruction;

a second register file coupled to said instruction register, said second register file including a second target register;

at least two input ports, including a receiving one of which is coupled to said first output port, for receiving said result operand; and a second switching means coupled to said second instruction register, said fourth instruction designation controlling said second switching means to selectively couple said second target register to said receiving input port, to provide said result operand to said second target register;

whereby single instruction, multiple data processing can be performed.

3. The data processing system of claim 1, which further comprises:

at least two execution units coupled to said instruction register, said first instruction designation controlling selective coupling of said first operand register said a first one of said at least two execution units to provide to it said first operand;

said second instruction designation controlling said first one of said execution units to execute an operation on said first operand to produce a first result operand; and said third instruction designation controlling said switching means to selectively couple said first one of said execution units to either the first output port or the second output port, to provide said first result operand to the first succeeding processing element or to the second succeeding processing element, respectively.

4. The data processing system of claim 1, which further comprises:

an instruction sequencing means coupled to said storage means and to said instruction bus, for fetching said instructions from said storage means and broadcasting them to said plurality of processing elements.

5. A data processing method, comprising:

retrieving a plurality of instructions, each instruction including a first designation of a source register, a second designation of an execution unit operation, a third designation of an execution unit to output port routing, and a fourth designation of an input port to target register routing;

broadcasting one of said instructions to each of a plurality of processing elements;

controlling with said first instruction designation, a selective coupling of a first operand register with an execution unit in each of said processing elements, to provide a first operand;

controlling with said second instruction designation, said execution unit to execute an operation on said first operand to produce a result operand in each of said processing elements;

controlling with said third instruction designation, a switching means in each processing element to selectively couple said execution unit to either a first output port or a second output port, to provide said result operand to a first succeeding processing element or to a second succeeding processing element, respectively; and controlling with said fourth instruction designation, a selective coupling of a target register to either a first input port, to provide a first next operand to said target register or a second input port, to provide a second next operand to said target register;

whereby single instruction, multiple data processing can be performed.

* * * * *